US008862454B2

(12) United States Patent
Braman et al.

(10) Patent No.: US 8,862,454 B2
(45) Date of Patent: Oct. 14, 2014

(54) METHODS AND APPARATUS FOR SIMULATING RISK TOLERANCE AND ASSOCIATED ADVERSARY COSTS IN A DISTRIBUTED BUSINESS PROCESS

(71) Applicant: Norwich University Applied Research Institutes, Northfield, VT (US)

(72) Inventors: Eric W. Braman, Northfield, VT (US); Andrew W. Cutts, Henniker, NH (US); Michael Geilich, Cornish, NH (US); Dennis McGrath, Hartland, VT (US); Eric Richardson, Norwich, VT (US); Jeffrey A. Schmidt, Chicago, IL (US); Robert Schmidt, Princeton, NJ (US)

(73) Assignee: Norwich University Applied Research Institutes, Northfield, VT (US)

( * ) Notice: Subject to any disclaimer, the term of this patent is extended or adjusted under 35 U.S.C. 154(b) by 0 days.

(21) Appl. No.: 13/679,302

(22) Filed: Nov. 16, 2012

(65) Prior Publication Data
US 2013/0151229 A1    Jun. 13, 2013

Related U.S. Application Data

(63) Continuation-in-part of application No. 13/187,700, filed on Jul. 21, 2011, now Pat. No. 8,370,123, which is a continuation of application No. 12/828,777, filed on Jul. 1, 2010, now Pat. No. 7,996,205, which is a continuation of application No. 11/556,462, filed on Nov. 3, 2006, now Pat. No. 7,752,027.

(60) Provisional application No. 60/823,879, filed on Aug. 29, 2006.

(51) Int. Cl.
*G06F 9/45* (2006.01)

(52) U.S. Cl.
USPC .......................................... 703/22; 705/7.28

(58) Field of Classification Search
USPC ................. 703/2, 6, 13, 22; 705/1.1, 7.28
See application file for complete search history.

(56) References Cited

U.S. PATENT DOCUMENTS

| 7,100,195 | B1 * | 8/2006 | Underwood | 726/2 |
| 7,797,403 | B2 * | 9/2010 | Vedula et al. | 709/220 |
| 2007/0016557 | A1 * | 1/2007 | Moore et al. | 707/3 |
| 2008/0065521 | A1 * | 3/2008 | Horowitz | 705/35 |
| 2008/0082348 | A1 * | 4/2008 | Paulus et al. | 705/1 |

OTHER PUBLICATIONS

Gao et al, Intelligent Decision Support for Family Financial Planning, Proceedings of the 39th Annual Hawaii International Conference on System Sciences, Jan. 2006, pp. 1-9.*

* cited by examiner

*Primary Examiner* — Russell Frejd
(74) *Attorney, Agent, or Firm* — Faegre Baker Daniels LLP

(57) ABSTRACT

Methods and apparatus for simulating risk tolerance and associated adversary costs in a distributed business process are disclosed. The methods and apparatus simulate an interdependent business process, such as a financial transaction system, in a secure distributed manner. Each business entity that is part of the interdependent business process models itself on a local client device at any chosen level of detail. A simulation server connects the separate client based simulations into one large simulation. Details of each local simulation may be hidden from other simulation participants. However, interruptions in business flow caused by simulated disruptions introduced at the simulation server and/or a client device are propagated to all of the effected simulation participants via the simulation server. In addition, the simulation server receives inputs from users indicative of risk tolerance levels and associated response actions. If the operational costs imposed by a selected response action are greater than a deterrence threshold associated with a particular adversary, the adversary is not deterred from causing a certain disruption to the simulated competitive market environment. If the operational costs imposed by a selected response action are greater than the deterrence threshold the adversary is deterred.

29 Claims, 29 Drawing Sheets

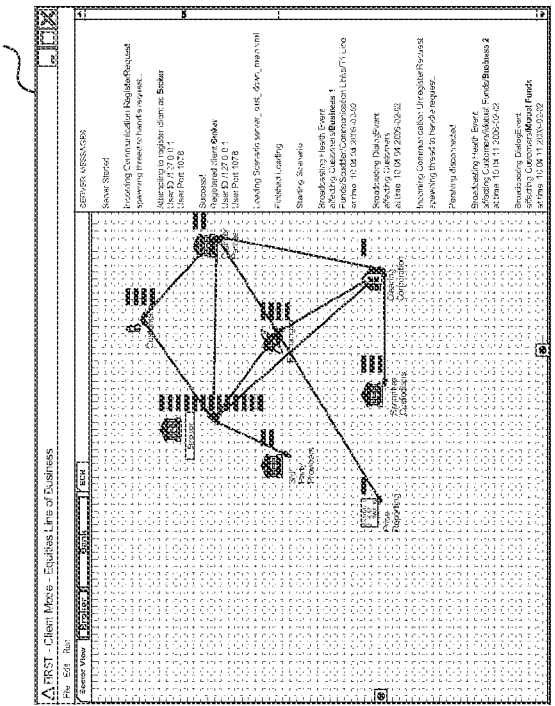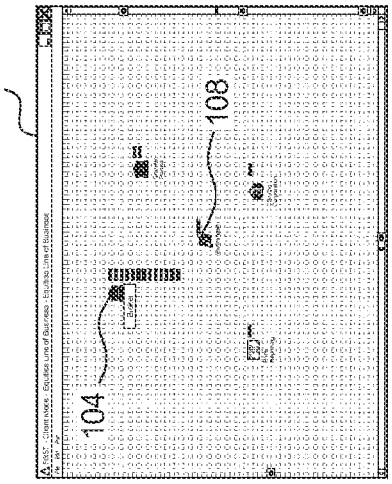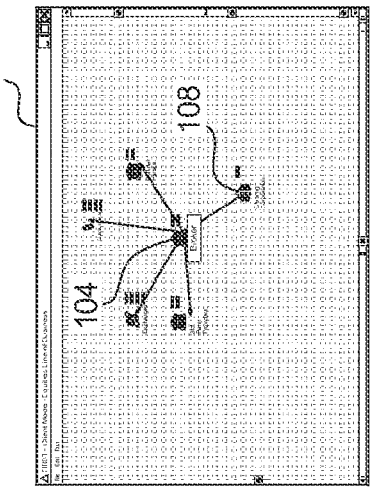
FIG. 15

METHODS AND APPARATUS FOR SIMULATING RISK TOLERANCE AND ASSOCIATED ADVERSARY COSTS IN A DISTRIBUTED BUSINESS PROCESS

PRIORITY CLAIM

This application is a continuation-in-part of U.S. patent application Ser. No. 13/187,700, filed on Jul. 21, 2011, now U.S. Pat. No. 8,370,123 which is a continuation of U.S. patent application Ser. No. 12/828,777, filed on Jul. 1, 2010, now U.S. Pat. No. 7,996,205, which is a continuation of U.S. patent application Ser. No. 11/556,462, filed on Nov. 3, 2006, now U.S. Pat. No. 7,752,027, which claims priority to and the benefit of U.S. Provisional Patent Application Ser. No. 60/823,879 filed on Aug. 29, 2006, the entire contents of each of which are hereby incorporated.

GOVERNMENT LICENSE RIGHTS

This invention was made with Government support under Contract FA8750-05-2-0021 awarded by the Air Force. The Government has certain rights in this invention.

TECHNICAL FIELD

The present disclosure relates in general to computer based simulations, and, in particular, to methods and apparatus for simulating risk tolerance and associated adversary costs in a distributed business process.

BACKGROUND

Administrators of complex business processes typically take precautions to help ensure that their business processes continue to operate despite the occurrences of certain unwanted events. For example, many business processes use computer systems for at least a portion of the business process. Often, precautions are taken to ensure that data continues to flow in to and out of these computer systems despite failures of certain devices in the system. For example, backup storage systems and redundant communications paths are often used to increase the integrality of a computing system.

However, these precautions are normally only taken within the particular entity. Typically, a business that relies on another business cannot force the other business to build robust systems, and most businesses are not willing to share the internal details of their operation with other businesses. This is especially true in highly regulated businesses such as banking, finance, health care, energy, etc. As a result, each business typically takes an approach that assumes there is some level of risk that any incoming and/or outgoing communication path may be disrupted.

Network simulation tools help the administrator visualize what devices are in his/her particular network and how those devices are connected to other devices in his/her network. In addition, network simulation tools may allow the administrator to make certain assumptions about devices outside of his/her business that have a direct relationship with one or more devices inside his/her business.

However, these types of assumptions may not be accurate and typically do not take into account ripple effects caused by indirect relationships with other devices. In order to accurately simulate these ripple effects, the network administrator would need to know information about devices outside of his/her business. In addition, network simulation tools do not allow a user to simulate his overall business process. For example, if a portion of a business process calls for an administrator to manually switch from a local call center to a foreign call center in the event of a failure at the local call center, network simulation tools do not allow these "people processes" to be simulated, and business people are typically not willing to expose these types of business model details to other organizations.

Further, these simulation tools do not account for the different risk tolerance levels of different organizations and/or decision makers. Some actions taken by organizations impose operational costs on adversaries that deter certain adversaries from causing certain disruptions to a simulated competitive market environment, and some operational costs imposed by risk tolerance levels do not deter certain adversaries.

Still further, these simulation tools do not account for "two-sided" simulations in which one side consists of organizations competing in a simulated business market and another side consists of a simulated adversary that has an objective of imposing costs on the simulated market, in whole or in part, through some actions intended to disrupt business critical systems operated by one or more organizations within the market.

SUMMARY

The simulation system (i.e., methods, apparatus, and/or software) disclosed herein solves these problems. Unlike a network simulation tool, the disclosed business process simulation system allows enterprise managers to practice business responses in a simulated environment that is free from real-world business risks. Specifically, the simulation system disclosed herein uses a secure distributed model wherein each business entity models itself on a local client device at any chosen level of detail, and a simulation server connects the separate client based simulations into one large simulation without exposing unauthorized details of one participant's internal simulation details to another simulation participant. In this manner, business entities participating in the simulation can exercise different fault scenarios and response strategies with other business entities. If a client device based model is not available, the server may supply a software agent to replace the inputs and outputs normally associated with that portion of the overall simulation. Interruptions in data and other business process flows caused by simulated disruptions introduced at the simulation server and/or a client device (e.g., by a simulated adversary, a simulation controller, and/or a real adversary) are propagated to all of the affected simulation participants via the simulation server. As each simulation participant receives the updated simulation scenario, business decisions are made by the simulation participants, and the effect of those decisions is propagated to all of the simulation participants, including any simulated adversaries. As a result, each simulation participant can share the benefit of an accurate model of its portion of the overall business process without exposing internal details of its business systems and processes.

In addition, the simulation server receives inputs from users indicative of risk tolerance levels. If response actions taken by an organization within the simulated market—those actions being limited by the resources available to that organization as determined by the constraints imposed on that organization by a selected level of organizational risk tolerance—, are greater than a deterrence threshold associated with a particular adversary, then the adversary is not deterred from causing a certain disruption to the simulated competitive market environment. On the other hand, if the operational costs imposed by a combined set of response actions taken by organizations are greater than the deterrence threshold of a simulated adversary, then the adversary may be deterred.

More specially, the response(s) that any organization takes to a disruption to one or more of its critical networks or systems, in accordance with a response plan, are often dictated by the risks that the organization perceives, as well as its tolerance for risk. These responses may differ depending on many risk-related factors including the extent to which the organization perceives that the disruption: (a) has, as its root cause, a problem internal to the organization, (b) impacts the organization's customer(s), (c) is or can be isolated to one or more business-critical systems, (d) has a common set of symptoms with other disruptions, (e) has an obvious root cause, (f) may cause irreparable damage to the business if further response actions are not taken, and/or (g) may affect the market as a whole. In other words, an organization's actions in response to a simulated operational disruption may to some degree be determined by the costs that the organization is willing to bear, which in turn are determined to some degree by the organization's perceptions of the disruption as it relates to simulated business risk.

In addition, using the system disclosed herein, some organizations within the market may select response actions that intentionally or otherwise impose operational costs on certain simulated adversaries that deter those adversaries from causing certain disruptions within a simulated competitive market environment, while other response actions may result in operational costs that do not deter certain adversaries, based on the adversaries' perceptions of risk.

BRIEF DESCRIPTION OF THE DRAWINGS

FIG. 15 is a screenshot of an example simulation from a server view and two different client views.

DETAILED DESCRIPTION OF EXEMPLARY EMBODIMENTS

Figure 1:
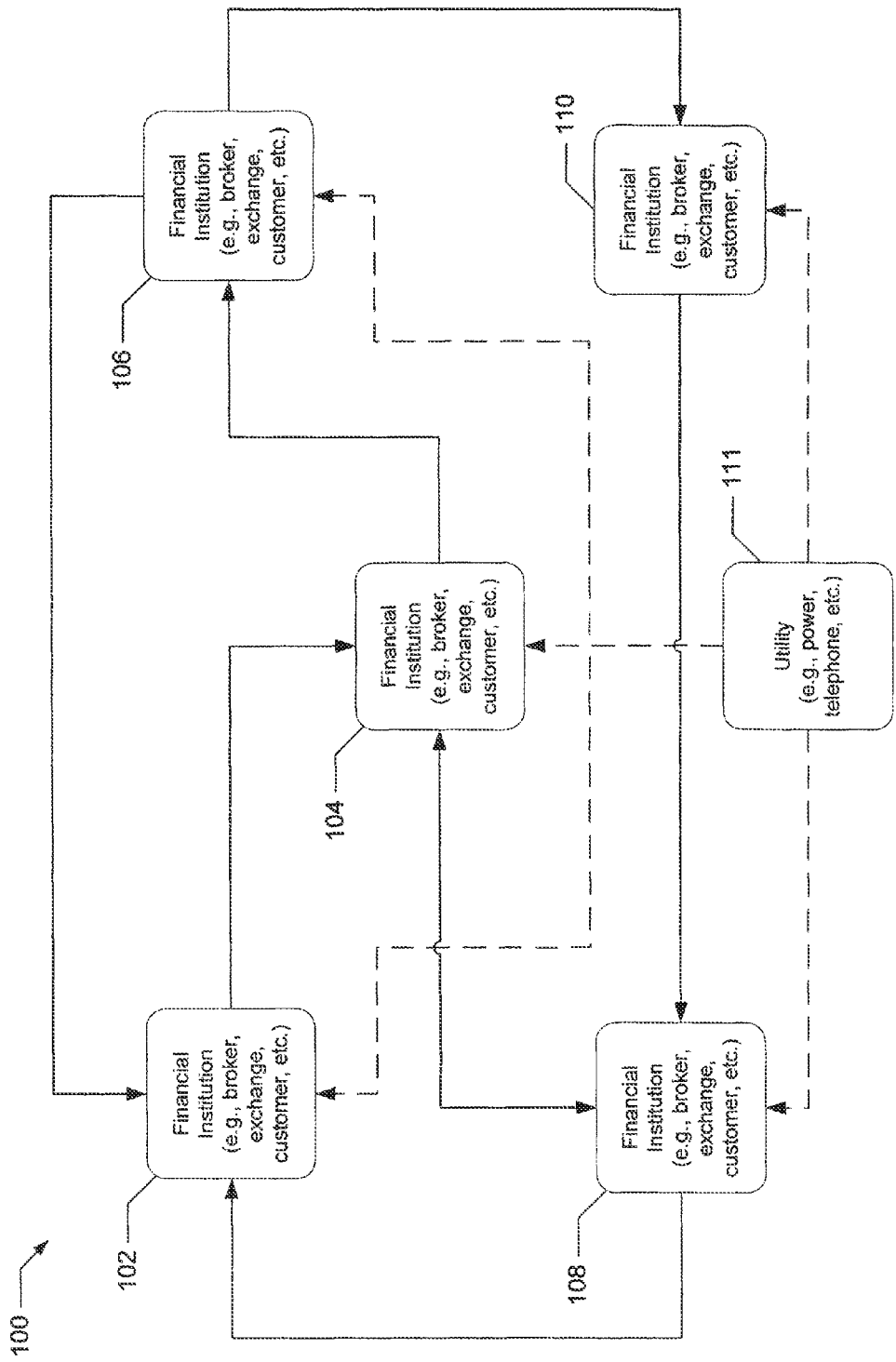
FIG. 1 is a high level block diagram of a business system showing direct and indirect relationships between business entities.

FIG. 1 is a high level block diagram of a business system 100 showing direct and indirect relationships between business entities 102-111. Example business entities include clearing member firms, clearing corporations, exchange brokers, settlement corporations, settlement and depository banks, price reporting corporations, service bureaus, power companies, and telephone companies. In the example illustrated in FIG. 1, five financial institutions 102-110 are shown. However, any number of financial institutions may be simulated by the disclosed system. In addition to the financial institutions 102-110, other business entities may be included in the simulation. For example, one or more utility companies such as a power company, a telephone company, etc. may be included in the simulation.

Each business entity may have one or more direct and one or more indirect relationships. For example, financial institution 104 has a direct relationship with financial institution 102, financial institution 106, and financial institution 108. Specifically, financial institution 104 takes inputs directly from financial institution 102 and financial institution 108. In addition, financial institution 104 feeds outputs directly to financial institution 106 and financial institution 108. These relationships may be based on any user defined criteria. For example, relationships between business entities may be at a business model level and/or a data connectivity level. Some business entities may have direct relationships with a large number of the other business entities. For example, a power company may have a direct relationship with all of the business entities in a particular geographic region.

Financial institution 104 may have an indirect relationship with financial institution 106, financial institution 108, and/or financial institution 110. Specifically, financial institution 106 may indirectly affect financial institution 104 via financial institution 102. In addition, financial institution 106 may affect financial institution 110, which in turn may affect financial institution 108, which in turn may affect financial institution 104. Financial institution 108 may have a direct affect on financial institution 104 and an indirect affect on financial institution 104 via financial institution 102. In fact, financial institution 104 may affect financial institution 108, which in turn may affect financial institution 102, which in turn may loop all the way back to affect financial institution 104. In this example, financial institution 104 does not have an indirect relationship with financial institution 102, because financial institution 102 does not send outputs to any financial institutions other than financial institution 104.

Figure 2:
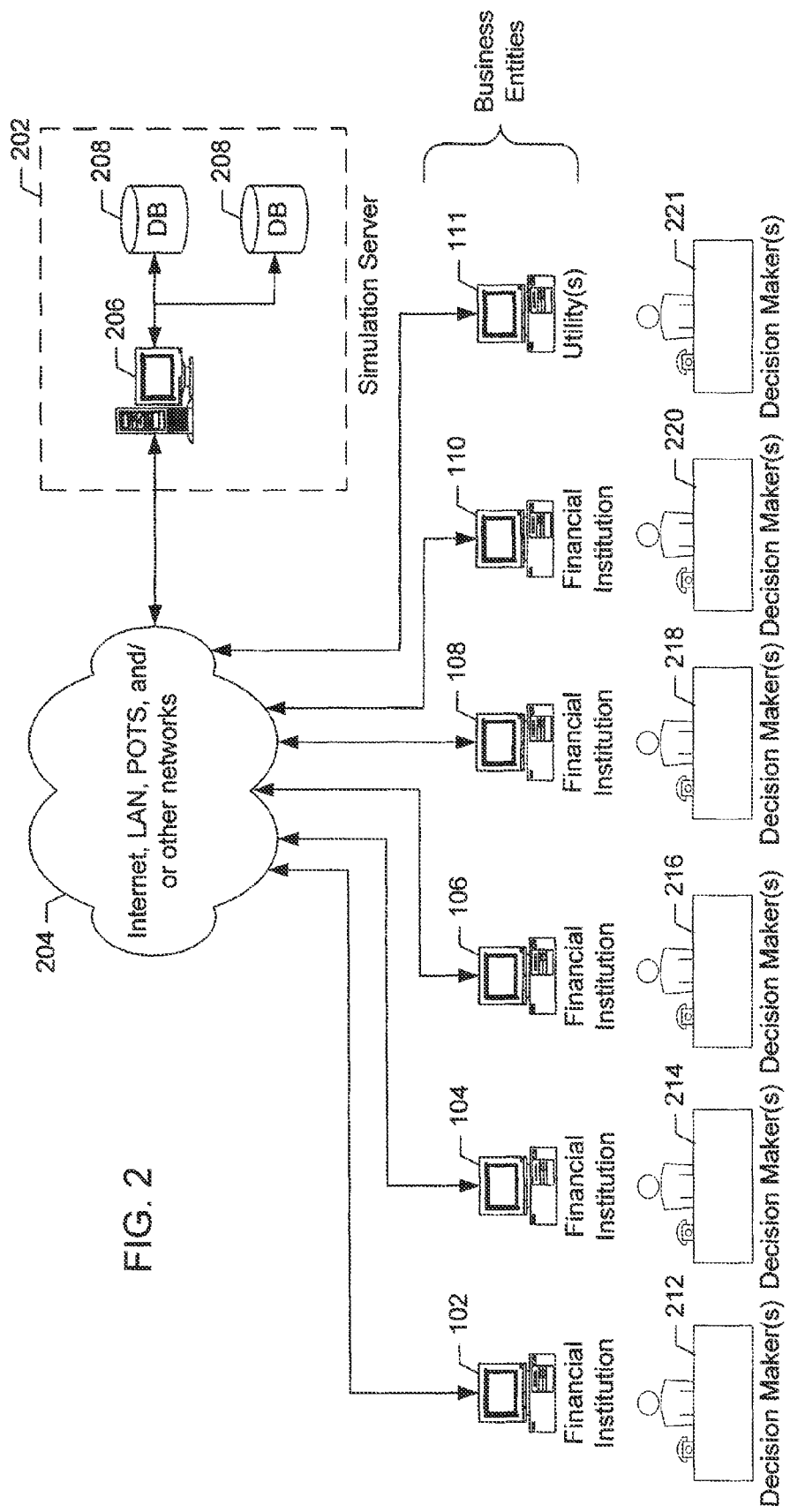
FIG. 2 is a high level block diagram of a communications system.

In order to simulate the effect of a disruption somewhere in the business system 100 including any ripple effects caused by both the direct and the indirect relationships, a network communications system is preferably used. A high level block diagram of an example network communications system 200 is illustrated in FIG. 2. The illustrated system 200 includes one or more client devices associated with the business entities 102-111 and one or more simulation servers 202. Each of these devices may communicate with each other via a connection to one or more communications channels 204 such as the Internet and/or some other data network, including, but not limited to, any suitable wide area network or local area network. It will be appreciated that any of the devices described herein may be directly connected to each other instead of over a network.

The simulation server 202 may include one or more computing devices 206 and one or more databases 208. One simulation server 202 may interact with a large number of other devices. Accordingly, each simulation server 202 is typically a high end computer with a large storage capacity, one or more fast microprocessors, and one or more high speed network connections. Conversely, relative to a typical server 202, each client device associated with the business entities 102-111 typically includes less storage capacity, a single microprocessor, and a single network connection. During a simulation, each participating client device is associated with one or more decision makers 212-221.

Figure 3:
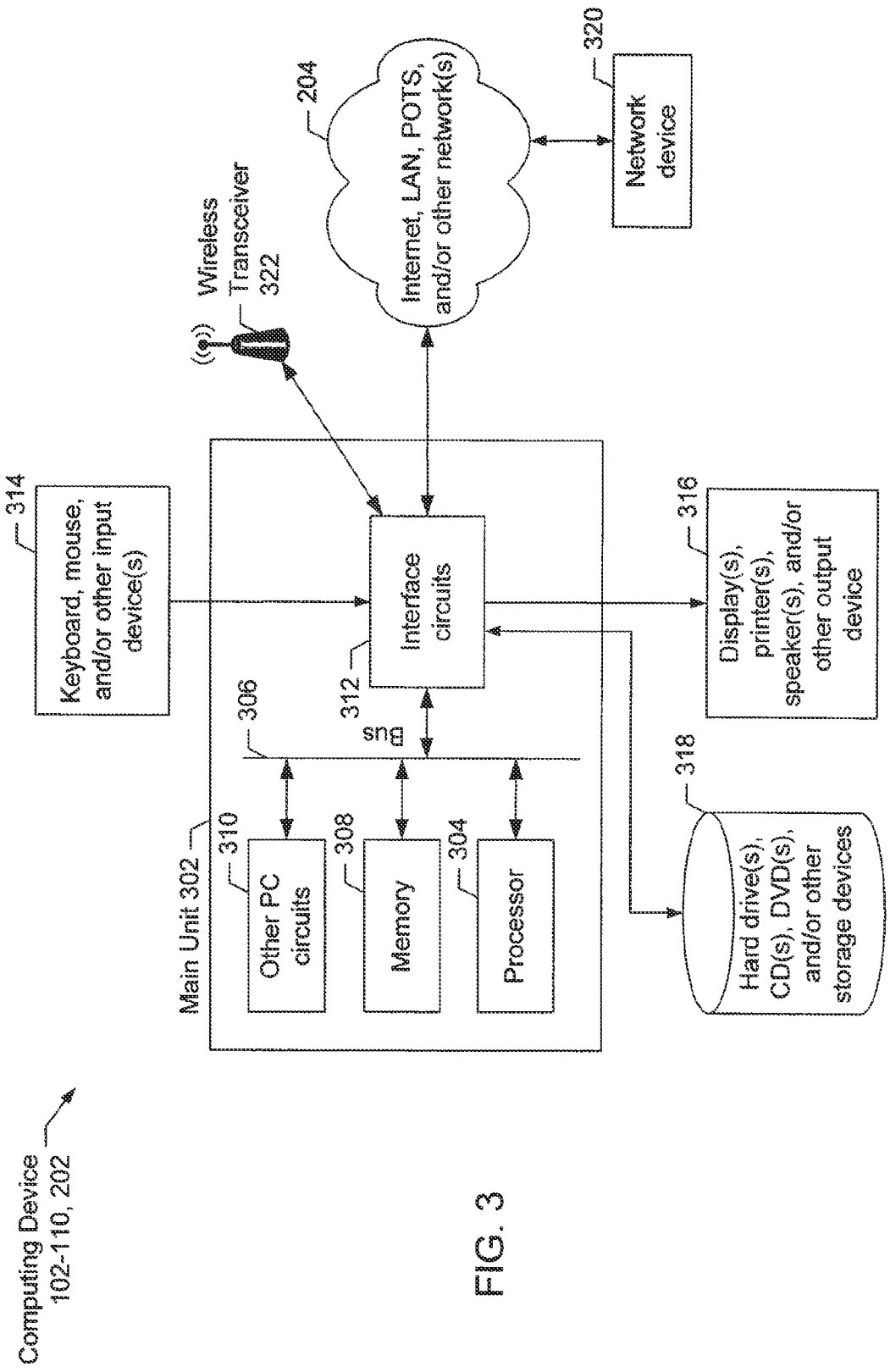
FIG. 3 is a more detailed block diagram showing one example of a computing device.

A more detailed block diagram of the electrical systems of an example computing device (e.g., a client 102-111 or a server 202) is illustrated in FIG. 3. Although the electrical systems of these computing devices 102-111, 202 may be similar, the structural differences between these devices are well known. The example computing device 102-111, 202 includes a main unit 302 which preferably includes one or more processors 304 electrically coupled by an address/data bus 306 to one or more memory devices 308, other computer circuitry 310, and one or more interface circuits 312. The processor 304 may be any suitable processor, such as a microprocessor from the INTEL PENTIUM® family of microprocessors. The memory 308 preferably includes volatile memory and non-volatile memory. Preferably, the memory 308 stores a software program that interacts with the other devices in the communications system 200 as described below. This program may be executed by the processor 304 in any suitable manner. The memory 308 may also store digital data indicative of documents, files, programs, web pages, etc. retrieved from another computing device 102-111, 202 and/or loaded via an input device 314.

The interface circuit 312 may be implemented using any suitable interface standard, such as an Ethernet interface and/or a Universal Serial Bus (USB) interface. One or more input devices 314 may be connected to the interface circuit 312 for entering data and commands into the main unit 302. For example, the input device 314 may be a keyboard, mouse, touch screen, track pad, track ball, isopoint, and/or a voice recognition system.

One or more displays, printers, speakers, and/or other output devices 316 may also be connected to the main unit 302 via the interface circuit 312. The display 316 may be a cathode ray tube (CRTs), liquid crystal displays (LCDs), or any other type of display. The display 316 generates visual displays of data generated during operation of the computing device 102-111, 202. The visual displays may include prompts for human input, run time statistics, calculated values, data, etc.

One or more storage devices 318 may also be connected to the main unit 302 via the interface circuit 312. For example, a hard drive, CD drive, DVD drive, and/or other storage devices may be connected to the main unit 302. The storage devices 318 may store any type of suitable data.

The computing device 102-111, 202 may also exchange data with other network devices 320 via a connection to the network 204. The network connection may be any type of network connection, such as an Ethernet connection, digital subscriber line (DSL), telephone line, coaxial cable, etc. Users of the communications system 100 may be required to register with one or more of the computing devices 102-111, 202. In such an instance, each user may choose a user identifier (e.g., e-mail address) and a password which may be required for the activation of services. The user identifier and password may be passed across the network 204 using encryption. Alternatively, the user identifier and/or password may be assigned by the computing device 102-111, 202.

Figure 4:
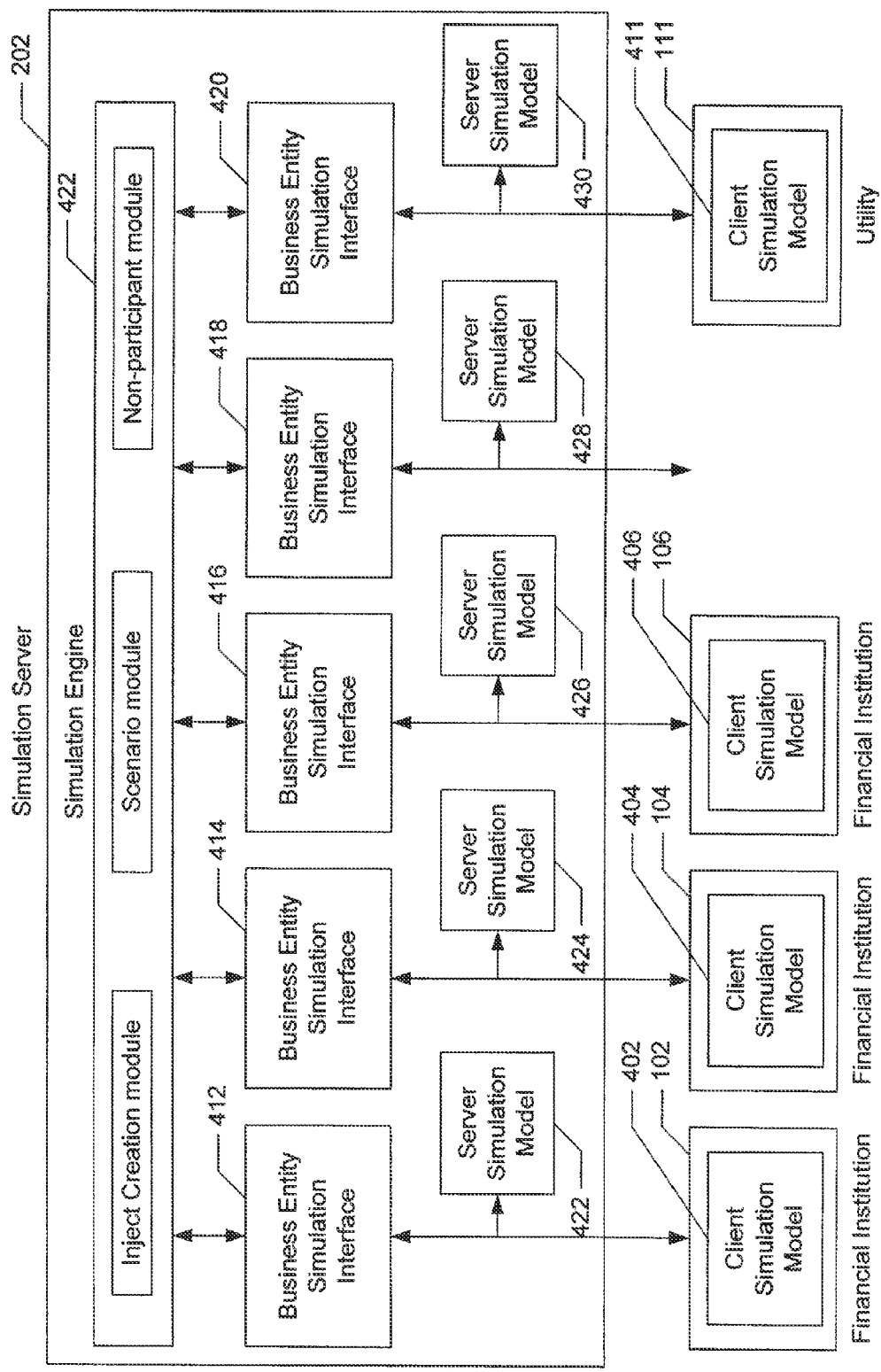
FIG. 4 is a block diagram showing example logical connections between a simulation server and a plurality of business entities.

As discussed above, the computing devices 102-111, 202 communicate via the network. As discussed in more detail below, each computing device 102-111, 202 operated by the associated decision makers 212-221 performs a portion of an overall simulation. FIG. 4 is a block diagram showing example logical connections between a simulation server 202 and a plurality of business entity client devices 102-106, 111. In this example, each participating business entity client device 102-111 executes a local simulation model 402-411. Each local simulation model 402-411 communicates with a simulation engine 422 via a corresponding business entity simulation interface 412-420. The simulation interfaces 412-420 may be separate as shown, or the simulation interfaces 412-420 may be combined.

The simulation interfaces 412-420 determine if the corresponding client device 102-111 is connected and participating. If a client device 102-111 is not connected and participating when a simulation is being executed, the simulation interface 412-420 interacts with a corresponding server simulation model 422-430 instead of the client simulation model 402-411. For example, financial institutions 108-110 are not connected in the example of FIG. 4. In such an instance, icons representing the client simulation model 402-411 are preferably grayed out. Preferably, client simulation models 402-411 are accurate representations of actual business models created by the associated financial institutions. In contrast, server simulation models 422-430 are preferably substitutes for one or more client simulation models 402-411. The server simulation models 422-430 may be default models for the type of business entity 102-111 that is not connected, and/or the server simulation models 422-430 may be modified.

Figure 5:
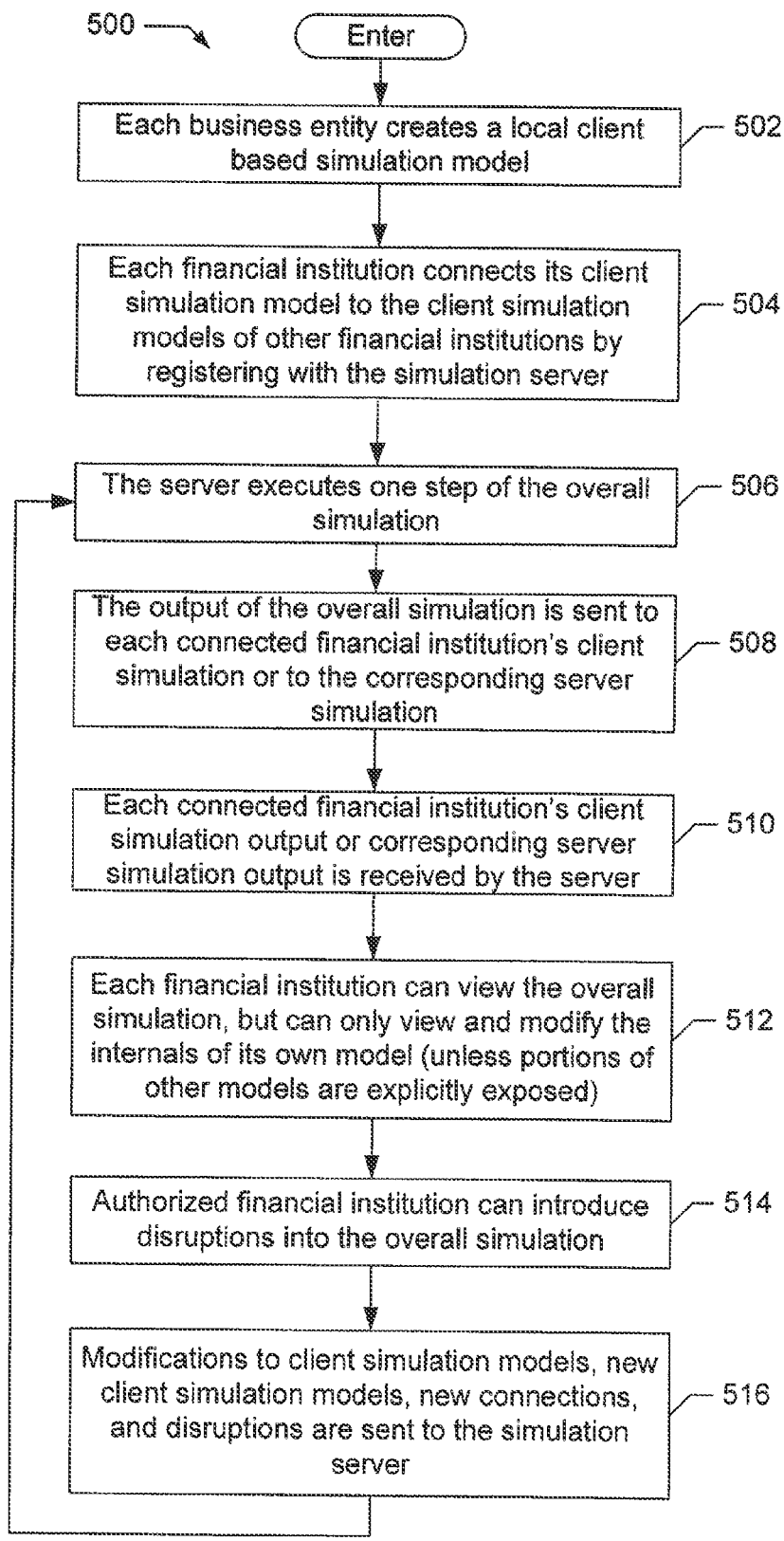
FIG. 5 is a flowchart of an example process to simulate a financial transaction system.

A flowchart of an example process 500 to simulate a business system such as a financial transaction system is illustrated in FIG. 5. Preferably, the simulation process 500 is embodied in one or more software programs which is stored in one or more memories and executed by one or more processors. For example, the simulation process 500 may be software running on the simulation server 202 and/or one or more of the business entity client devices 102-111. Although the simulation process 500 is described with reference to the flowchart illustrated in FIG. 5, it will be appreciated that many other methods of performing the acts associated with simulation process 500 may be used. For example, the order of many of the steps may be changed, and some of the steps described may be optional.

Generally, the simulation process 500 executes a business system simulation such as a financial transaction simulation in a secure distributed manner by keeping details associated with each business entity's business model (e.g., financial institution model 402-410) local to a client device 102-111 associated with that business entity and routing data from one local simulation 402-411 to another local simulation 402-411 via the simulation server 202. In addition, the simulation server 202 acts as the overall master of the simulation and supplies server based simulation modules to replace unconnected business entities 102-111. Interruptions in data and other business flows caused by simulated disruptions and decision maker's reactions to those disruptions are propagated to all of the effected simulation participants via the simulation server 202. These disruptions and reactions may be introduced at the simulation server 202 and/or at any client device 102-111. In an embodiment, disruptions are caused by one or more real and/or simulated adversaries. For example, a real and/or a simulated adversary may launch a cyber attack on one or more business entities 102-111 in an attempt to disrupt or disable one or more systems associated with a business entity 102-111.

More specifically, each business entity creates a local client based simulation model 402-411 (block 502). As described in more detail below with references to example screenshots of the simulation system, each business entity 102-111 creates a simulation model of itself and indicates connections to its direct relationships. As described above with reference to FIG. 1, the modeled business entities 102-111 has a direct relationship with other business entities 102-111 that directly affect the modeled business entity 102-111 and a direct relationship with other business entities 102-111 that are affected by the modeled business entity 102-111. For example, an invoked policy at one business entity 102-111 may directly affect another business entity's business model, and/or data from one business entity 102-111 may directly affect another business entity 102-111.

The client simulation model 402-411 may be as general or as specific as the designer wants the client simulation model 402-411 to be. For example, a general client simulation model 402-411 may model business rules like "if oil goes above a certain price, close all trades," or "if there is a perceived level of business risk to one or more customers, or to the simulated market as a whole, as the result of a disruption to a particular systems, then disconnect the affected system from the network and re-route trading traffic to other healthier systems." A general communications systems model may indicate that each computing system is located in the West Coast region, the Midwest region, or the East Coast region. Alternatively, a specific client simulation model 402-411 may include a plurality of details about what types of events affect what type of trades and/or details about the buildings and cities where the computing systems are located.

Once the designer of the local client based simulation model 402-411 is satisfied with the local client based simulation of his own business entity 102-111, the designer may connect the local client based simulation model 402-411 to the client simulation models of other business entities 102-111 by registering with the simulation server 202 (block 504).

The details of the client based simulations 402-411 are not exposed to the simulation server 202 unless the designer chooses to expose one or more levels of detail. For example, a business entity 102-111 may choose to expose details about the geographic locations and/or roles of its facilities but not what business rules those facilities follow and/or not how many or what type of devices are located at those facilities.

After one or more client based simulations 402-411 are connected via the simulation server 202, the simulation server 202 can execute one or more steps of the overall financial simulation (block 506). However, certain outputs from the overall financial simulation can only be processed by the connected client based simulations 402-411 and the corresponding decision makers 212-221, and certain inputs to the overall financial simulation can only come from the connected client based simulations 402-411 and the corresponding decision makers 212-221. Accordingly, a tailored view of the output of the overall business simulation is sent to each connected business entity's client simulation 402-411 (block 508).

In other words, each client simulation 402-411 receives inputs associated with that client simulation 402-411 based on that client simulation's role within the overall business model. For example, data indicative of a plurality of stock purchases may be sent from the simulation server 202 to a client based simulation 402-411 of a clearing corporation 110. Preferably, the simulation data sent to each client simulation 402-411 is also scaled to match that client simulation's role. For example, a small brokerage would receive fewer trades than a large brokerage. Accordingly, by using pie charts to define simulation variables, each entity can define its interactions as a percentage of a whole (e.g., as a percentage of a daily average trading volume). In addition, by using a hierarchy of optional pie charts, each entity can choose to define its business model at any level of detail.

If a client simulation 402-411 is disabled or otherwise unavailable, the output of the overall financial simulation may be sent to a corresponding server based simulation 422-430 representing the client based simulation 402-411 (block 508). As discussed above, client simulation models 402-411 are preferably accurate representations of actual business models, and server simulation models 422-430 are preferably substitutes for one or more client simulation models 402-411. For example, when a particular client based simulation 402-411 is not connected, the simulation server 202 may use a server based simulation representing the particular client based simulation 402-411. The server based simulation may be a simple software stub that accepts and/or generates a certain amount of canned financial transactions, or the server based simulation may be a complex financial simulation model. For example, the server based simulation may include the exposed portion of the corresponding client based simulation 402-411.

Each connected business entity 102-111 also sends outputs from its local client based simulation 402-411 to the simulation server 202 (block 510). For example, data indicative of a plurality of stock purchase confirmations may be sent from a client based simulation 402-411 to the simulation server 202. Alternatively, the output of a server based simulation representing a client based simulation 402-411 may be sent to the simulation server 202 (block 510).

Each business entity 102-111 participating in the simulation, and/or other business entities 102-111 given permission, may view the simulation at varying permission levels (block 512). However, each business entity 102-111 can only view and modify the internal details of its own model unless the other business entities 102-111 explicitly expose their own details (block 512). For example, one business entity 102-111 may model itself with four layers of detail and expose the first two layers of that detail to other business entities 102-111 for viewing but not for modifying.

Once the overall simulation is running, any authorized business entity 102-111 may introduce one or more actions in response to a perceived disruption or operational risk (block 514). For example, a business entity 102-111 may shut down all business operations at a particular geographic location. In an embodiment, disruptions are caused by one or more real and/or simulated adversaries. For example, a real and/or a simulated adversary may launch a cyber attack on one or more business entities 102-111 in an attempt to disrupt or disable one or more systems associated with a business entity 102-111.

Although other participants in the simulation may not have access to low levels of the simulation detail (i.e., that financial institution 102-110 did not expose that it had certain business rules and/or devices at a certain location), other business entities 102-111 affected by the initial disruption or by response actions taken by other simulated business entities, will see the effect of the disruption or response actions on their view of the overall simulation. In addition, chronological disruption scenarios may be executed. For example, a user of a simulation may want to see the effect of executing one business rule at one time and another business rule at a subsequent time.

Any modifications to client simulation models 402-411, any new client simulation models 402-411, any new connections between client simulation models, and any exposed disruptions, are uploaded to the simulation server 202 (block 516). Subsequently, the process steps 506-516 repeat. As a result, the overall simulation, including the affect of any disruptions is viewable by all authorized simulation participants.

Figure 6:
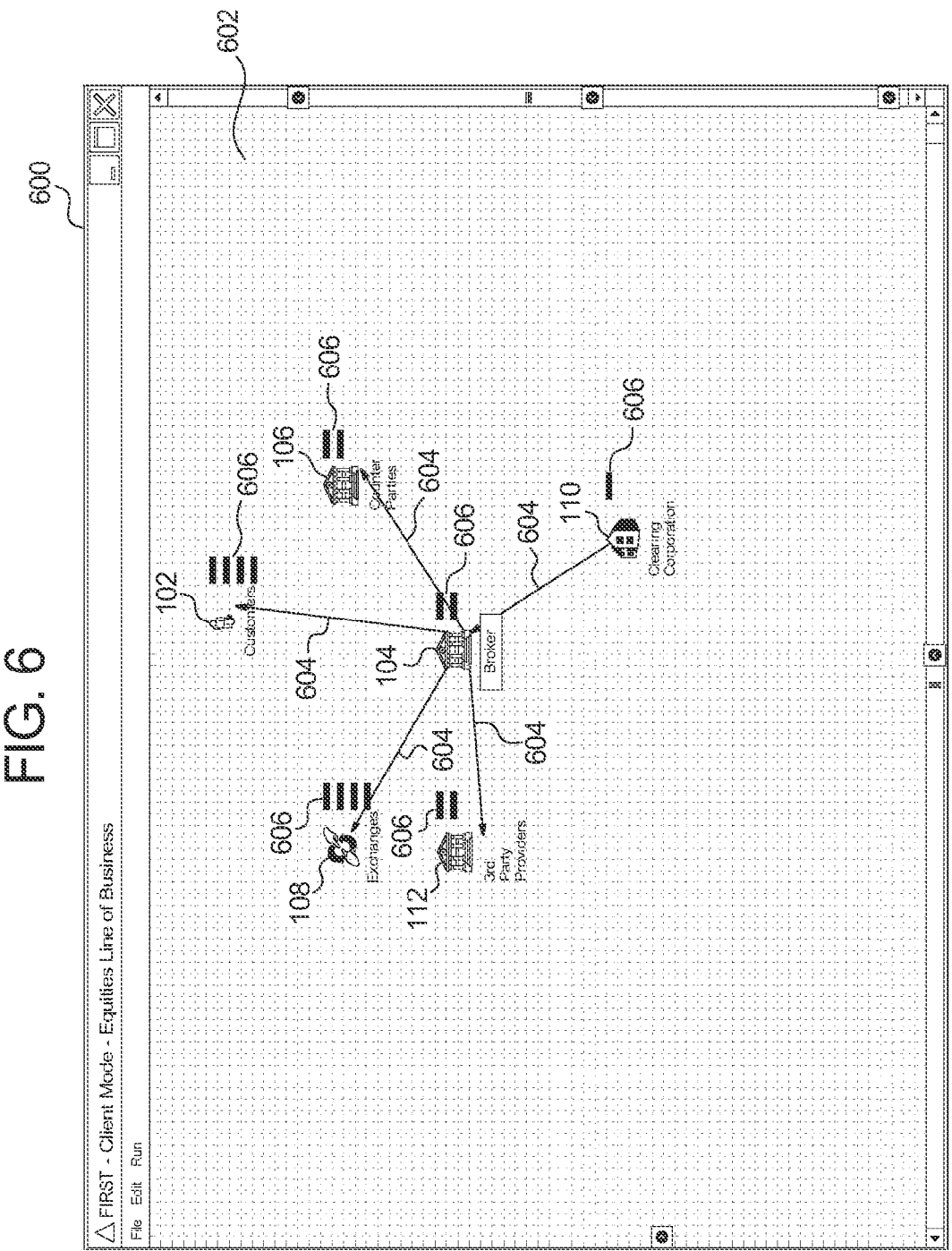
FIG. 6 is a screenshot of a top level view of an example graphical simulation tool used to create and/or modify a client based simulation model.

FIG. 6 is a screenshot of a top-level view of an example graphical simulation tool 600 used to create and/or modify a client based simulation model 402-411. In this example, the graphical simulation tool 600 includes a design canvas 602 where icons representing business entities 102-111 may be placed from a palette of available icons (not shown). In this example, a designer for a financial institution 104 is creating a client simulation model 404 called "BrokerCo." As indicated by connector lines 604, BrokerCo has direct relationships with its customers 102, their counter parties 106, one or more exchanges 108, one or more clearing corporations 110, and one or more third party providers 112.

Each business entity 102-112 represented in the simulation is modeled by a hierarchy of business entity detail. A branch indicator 606 associated with each business entity 102-112 indicates the number of branches below that level of the model. For example, the BrokerCo icon 104 includes two branch indicators 606.

Figure 7:
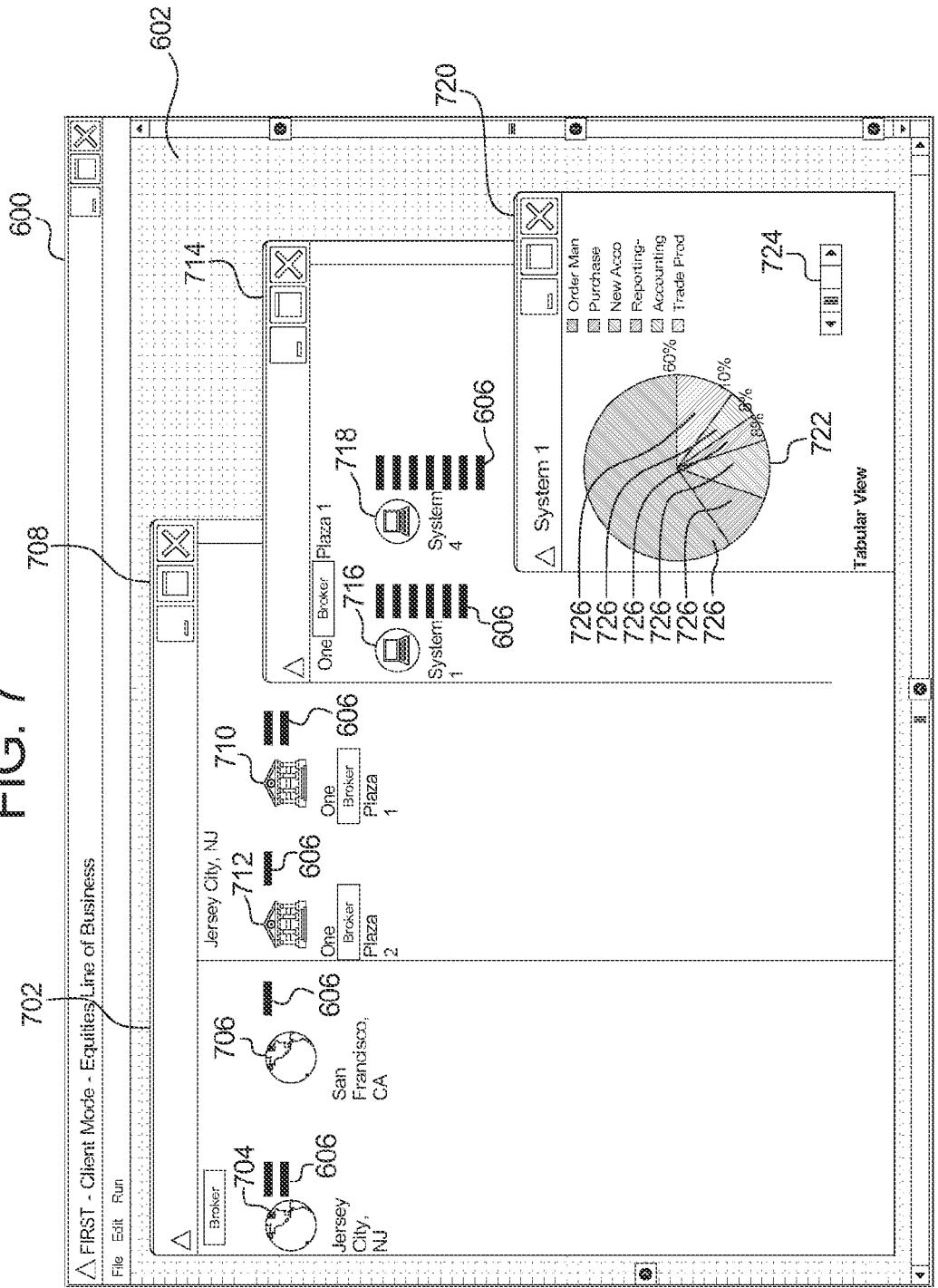
FIG. 7 is a screenshot of an example portion of internal simulation details associated with a local simulation model.

As shown in a drilldown window 702 associated with the BrokerCo business entity 104 (see FIG. 7), these two branch indicators 606 are indicative of two geographical locations associated with the BrokerCo line of business. Specifically, the BrokerCo example includes a Jersey City location 704 and a San Francisco location 706.

In another drilldown window 708, the Jersey City location 704 is broken down into a first building 710 and a second building 712. In a another drilldown window 714, the first building 710 is broken down into a first computer system 716 and a second computer system 718. The final drilldown window 720 in this example shows usage percentages for the first computer system 716 in a pie chart 722. The user can create and label any number of sections in the pie chart, and the percentages may be set by entering a number, dragging a scroll bar 724, dragging a pie edge 726, and/or any other suitable manner. Although computer systems and their responses to outside data are used as examples thorough out this description, it will be appreciated that any business rules may be simulated. For example, person to person interactions, person to machine interactions, and machine to person interactions may be simulated.

Figure 8:
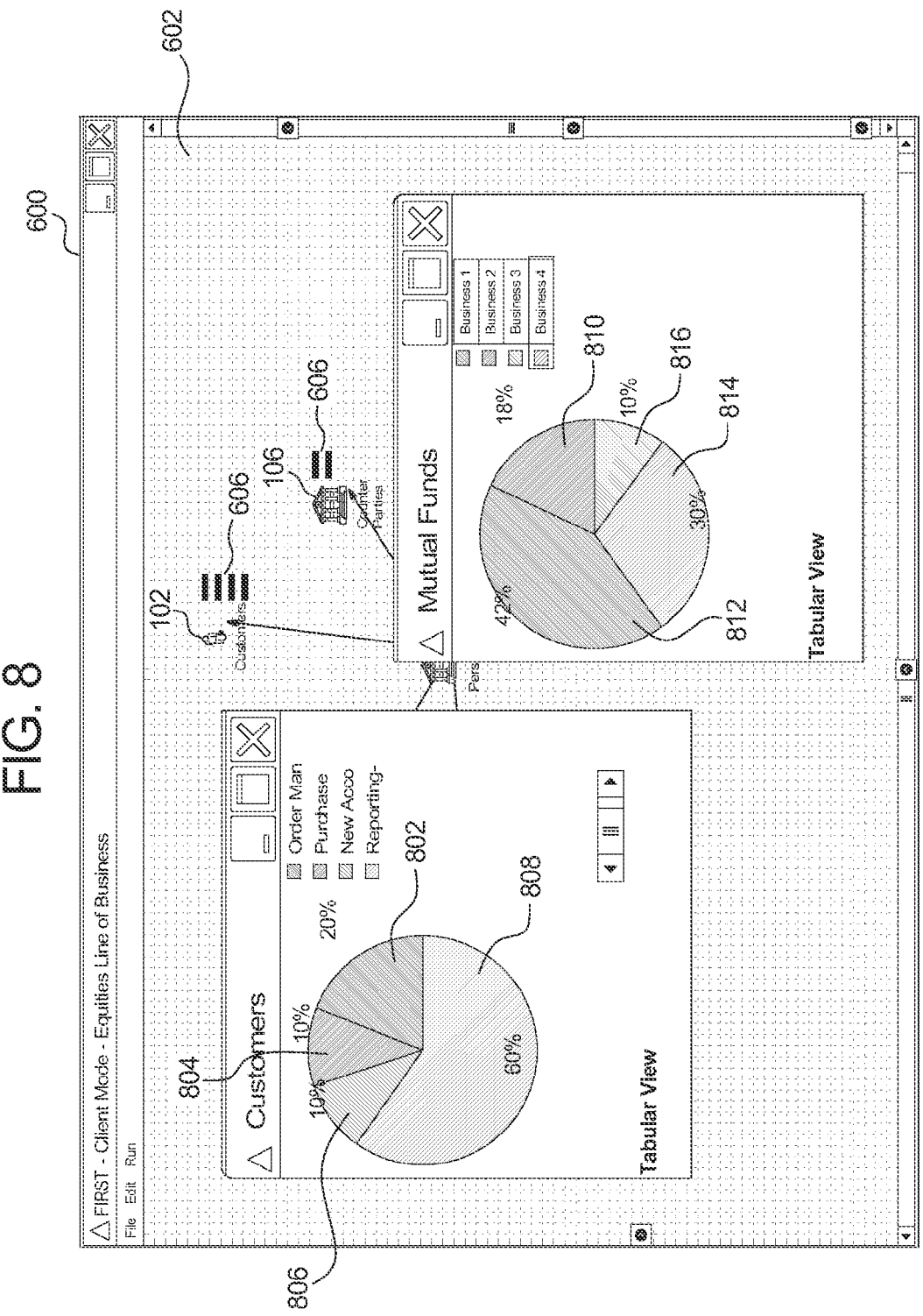
FIG. 8 is a screenshot of an example simulation model showing usage percentages that are broken down into multiple levels.

Usage percentages may be broken down into any number of standard and/or custom levels. The purpose of each level and whether a level is exposed to other users is determined by the simulation designer. In this manner, the system may be tailored and scaled to fit different types of users (e.g., large institutions and small institutions). For example, in FIG. 8 the customers icon 102 is first broken down into 20% mutual fund customers 802, 10% retail customers 804, 10% third party customers 806, and 60% institutional customers 808. Then the mutual fund customers 802 are further broken down into 18% from Business 1 (810), 42% from Business 2 (812), 30% from Business 3 (814), and 10% from Business 4 (816).

Figure 9:
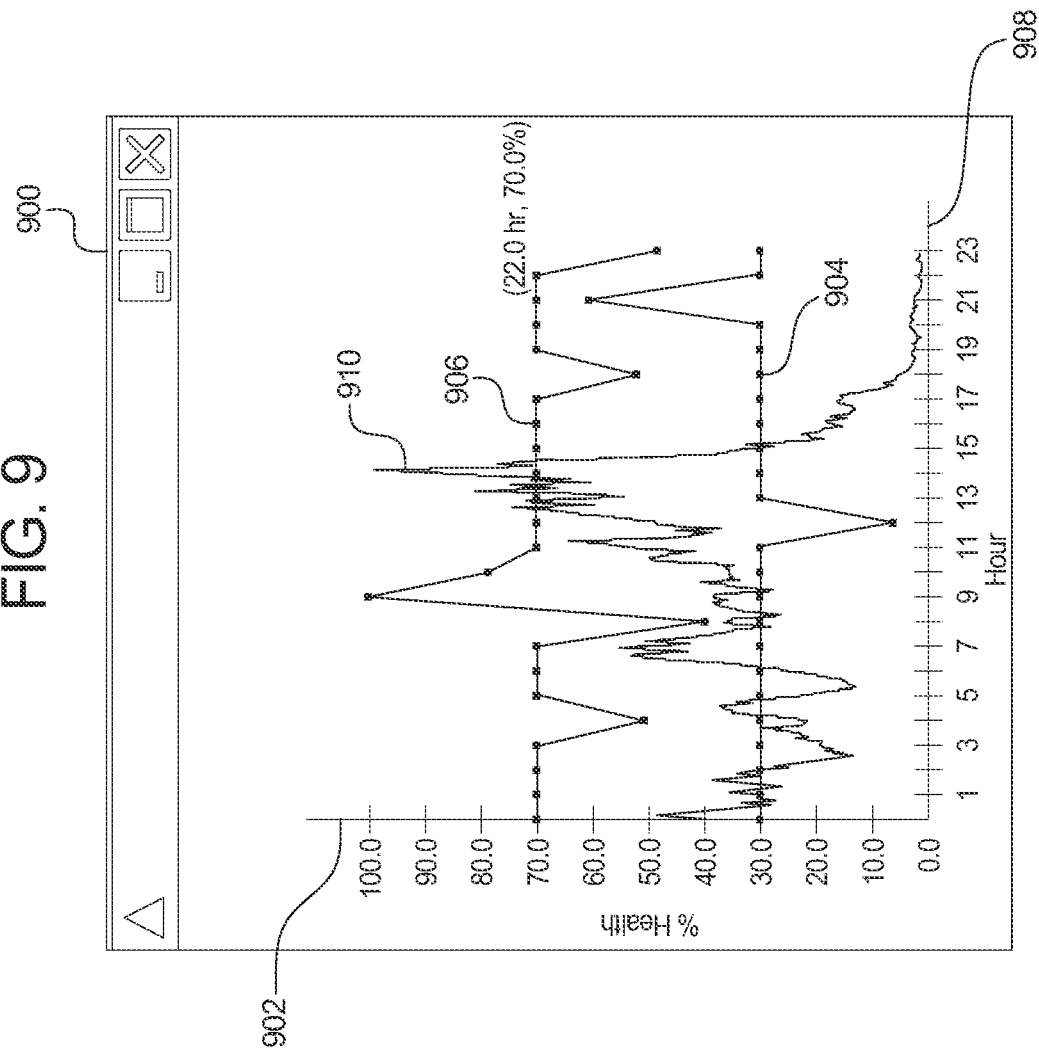
FIG. 9 is a screenshot of an example health graph.

In addition to the usage percentages described above, each element defined in a simulation model may be associated with a health percentage 902 in a health graph 900 as shown in FIG. 9. The health of an entity may be measured in time, money, and/or any other suitable units. In this example, a minimum health percentage 904 and a maximum health percentage 906 is defined for each hour 908 of a day. Different days of the week and months of the year may have different health percentage definitions. For example, the "health" of a broker personal element may be lower on certain holidays. Values in the health graph 900 may be edited in a table and/or by graphically dragging one or more grip points in the health graph 900. During execution of the simulation, the actual health percentage 910 may be displayed on the health graph 900. If the actual health percentage 910 goes above the maximum health percentage 906 and/or below the minimum health percentage 904, the system may generate an alert (see FIG. 20).

Figure 10:
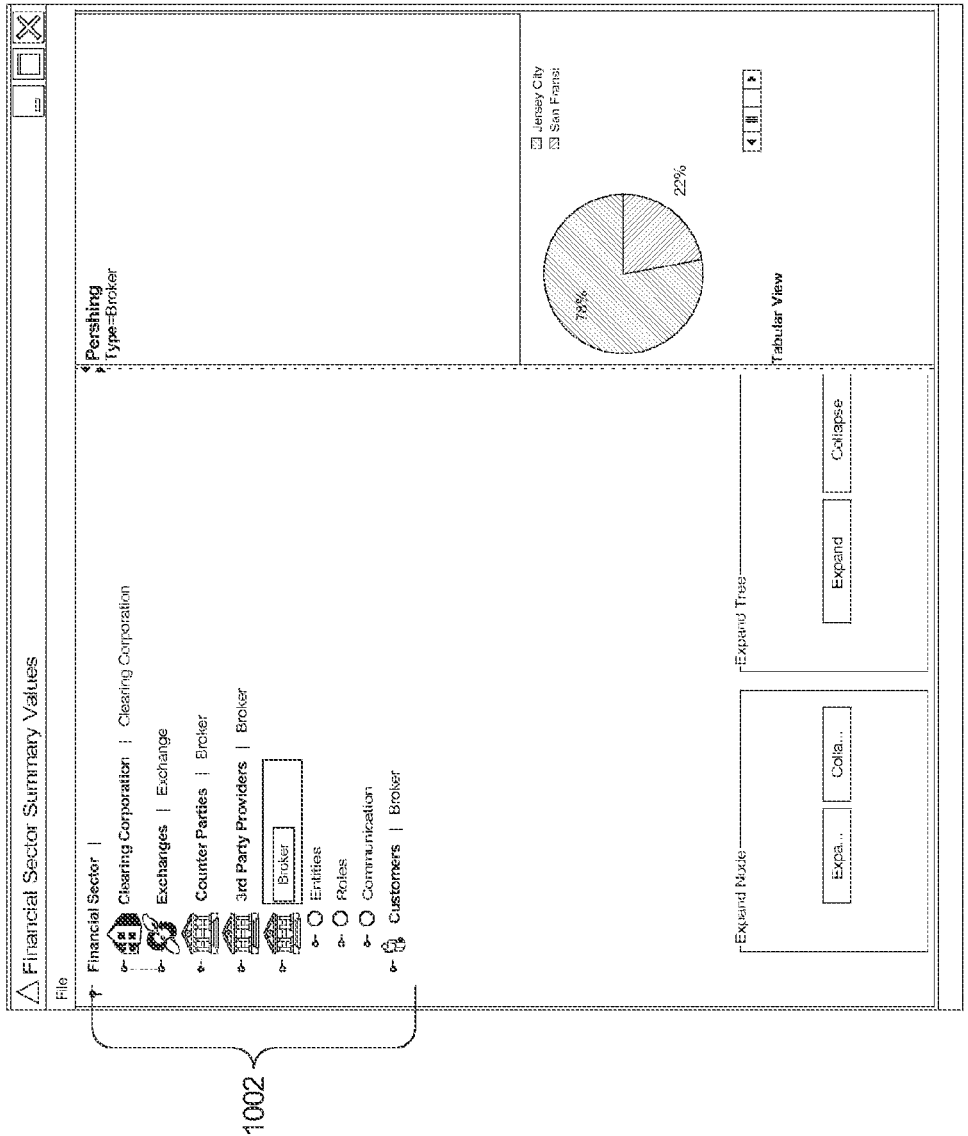
FIG. 10 is a screenshot of an example simulation model using a tree structure.
Figure 11:
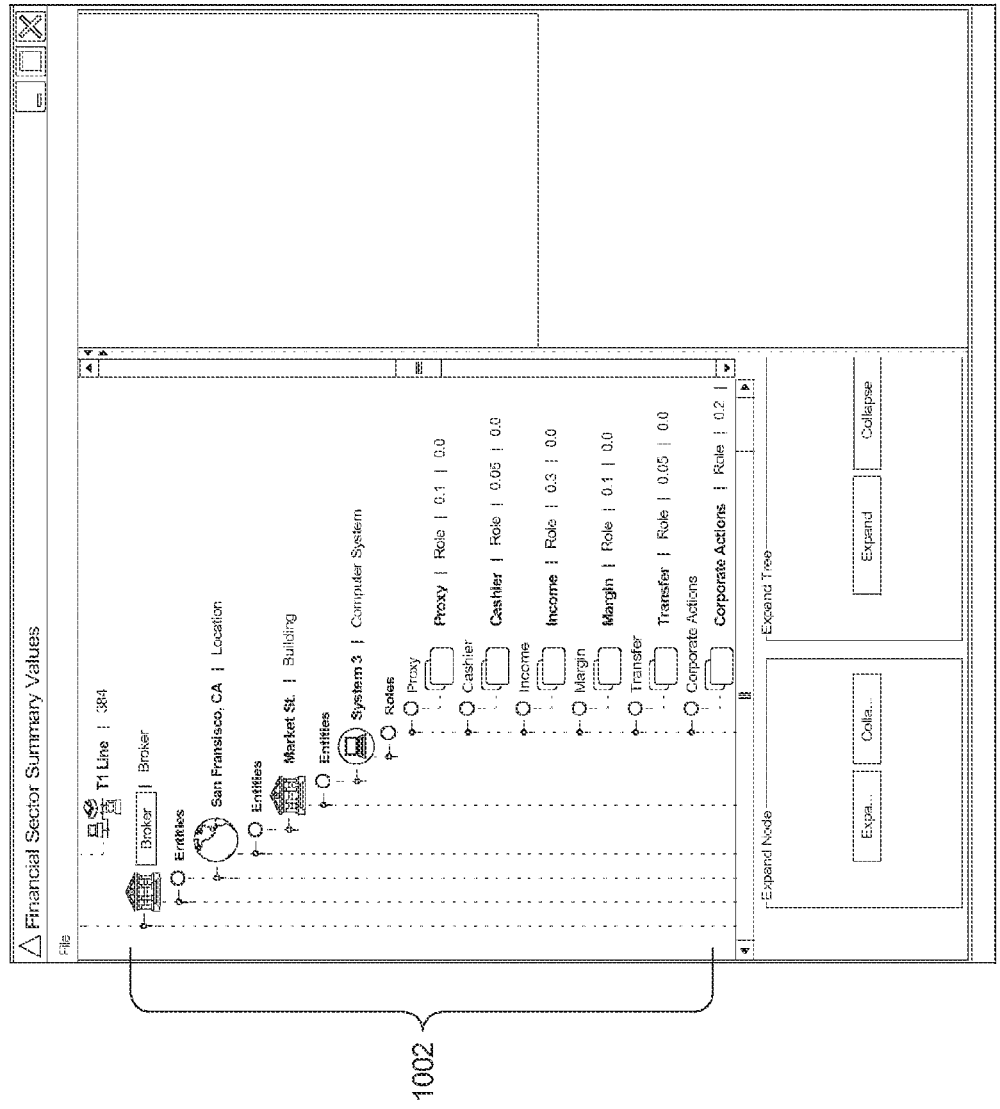
FIG. 11 is a screenshot of another example simulation model using a tree structure.
Figure 12:
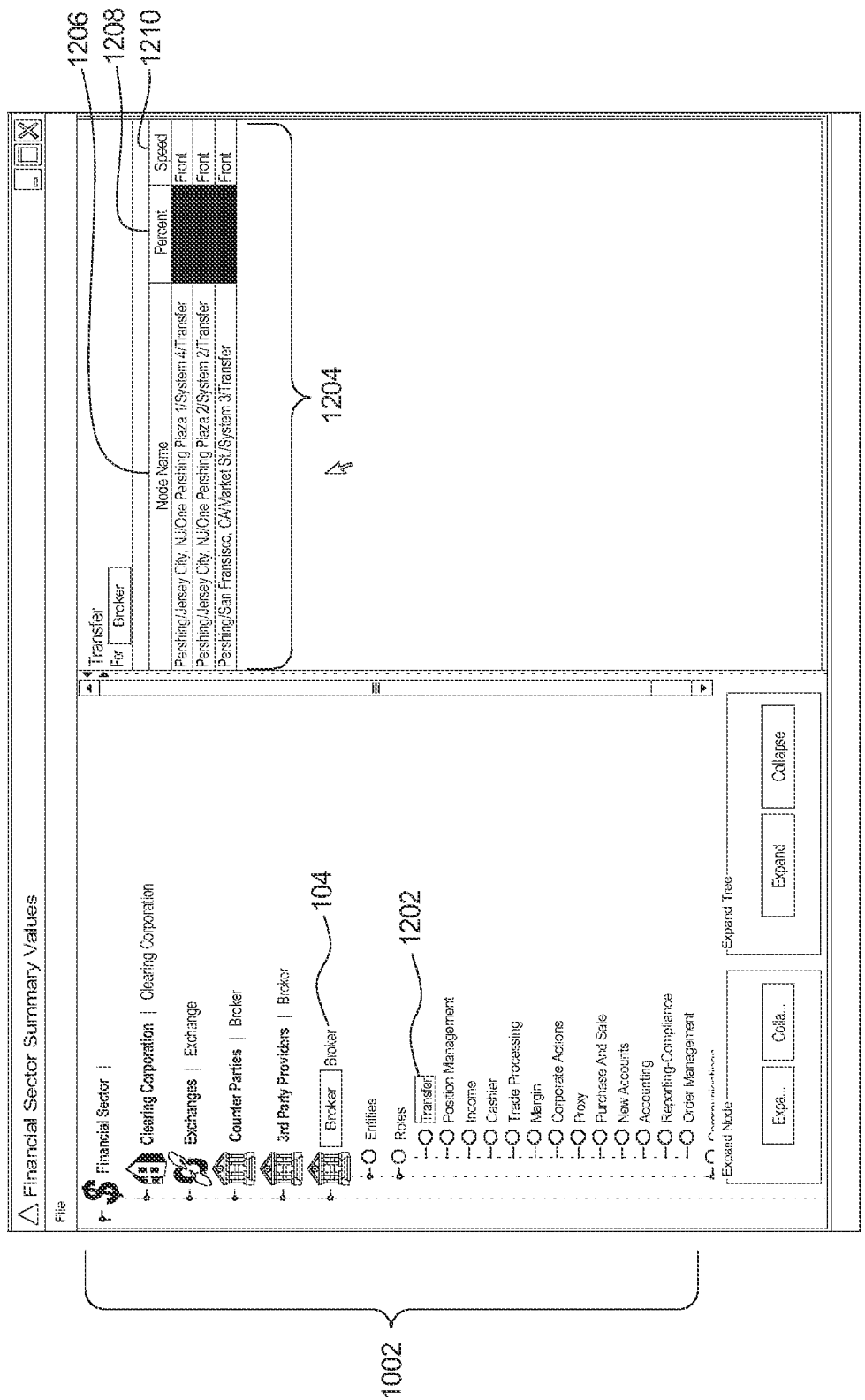
FIG. 12 is a screenshot of yet another example simulation model using a tree structure and showing a details table.

Information in a simulation model may also be viewed and modified using a tree structure 1002 as shown in FIGS. 10-12. From the tree structure 1002, icons can be added, deleted, expanded, collapsed, dragged to another portion of the simulation model, and/or dragged to another simulation. For example, if a business entity sells all of the assets at a particular location, the simulation model of that location may be moved from the seller's simulation model to the buyer's simulation model. In the example shown in FIG. 12, the "Transfer" role 1202 of the BrokerCo finical institution 104 is selected. As a result, a transfer table 1204 is displayed. The example transfer table 1204 includes a name 1206, a percent 1208, and a speed 1210 for each of the three examples shown. By selecting other icons, other tables may be displayed. The user may add, delete, and/or modify the simulation model via these tables.

Figure 13:
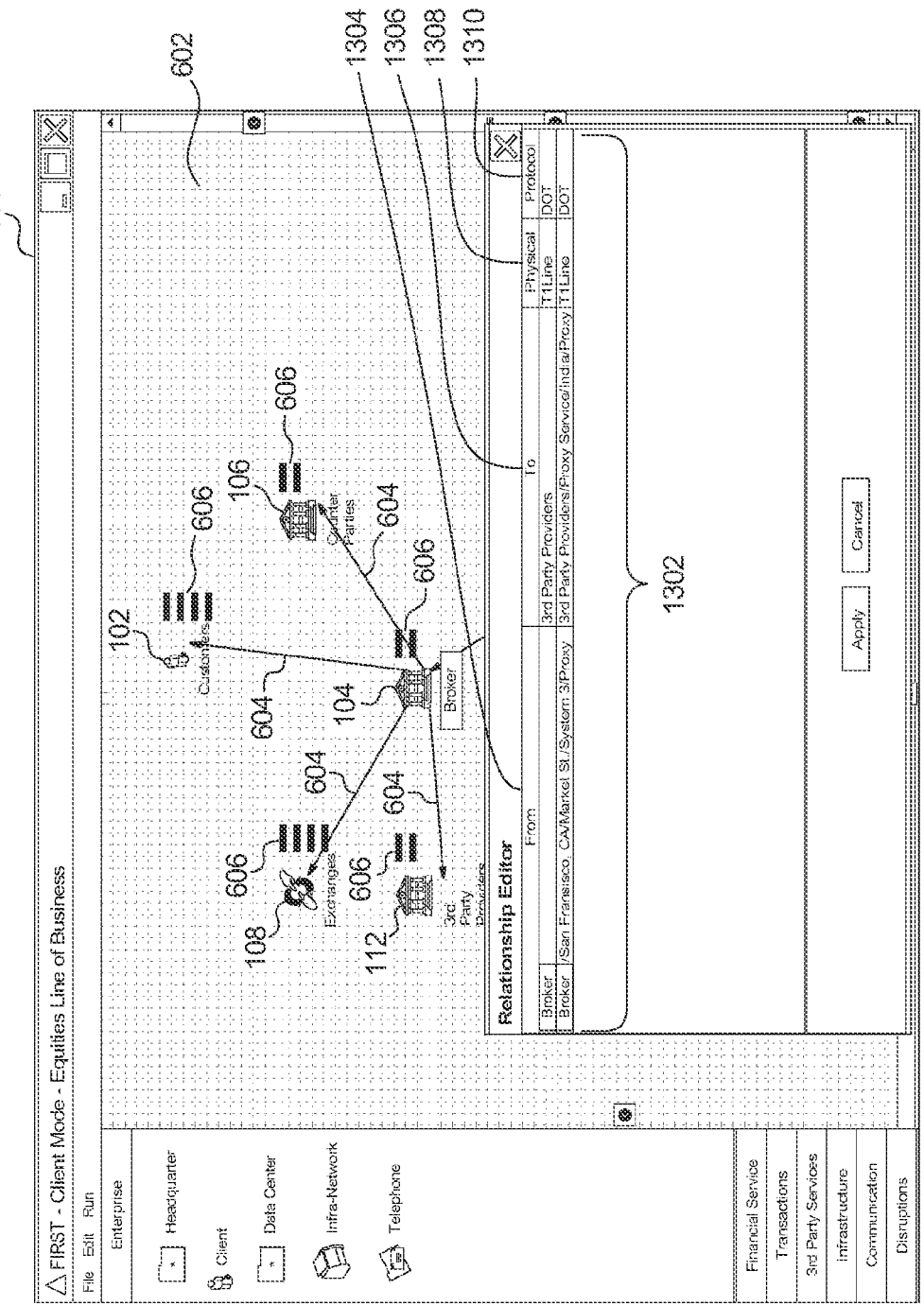
FIG. 13 is a screenshot of a top level view of an example client based simulation model showing a connections table.

In addition to editing business entities 102-112 of the simulation model via tables, connections between business entities 102-112 may be edited via a connections table 1302 when the user selects a connector line 604, as shown in FIG. 13. In this example, the connections table 1302 includes a "From" column 1304, a "To" column 1306, a "Physical" column 1308, and a "Protocol" column 1310. The "From" column 1304 indicates a starting business entity 102-112 for a connection, and the "To" column 1306 indicates an ending business entity 102-112 for the connection. The "Physical" column 1308 indicates the physical type of connection (e.g., ISDN, T1, T3, OC3, fiber optic, etc.), and the "Protocol" column 1310 indicates the protocol used on the connection (e.g., DOT, voice, FAX, etc.).

Figure 14:
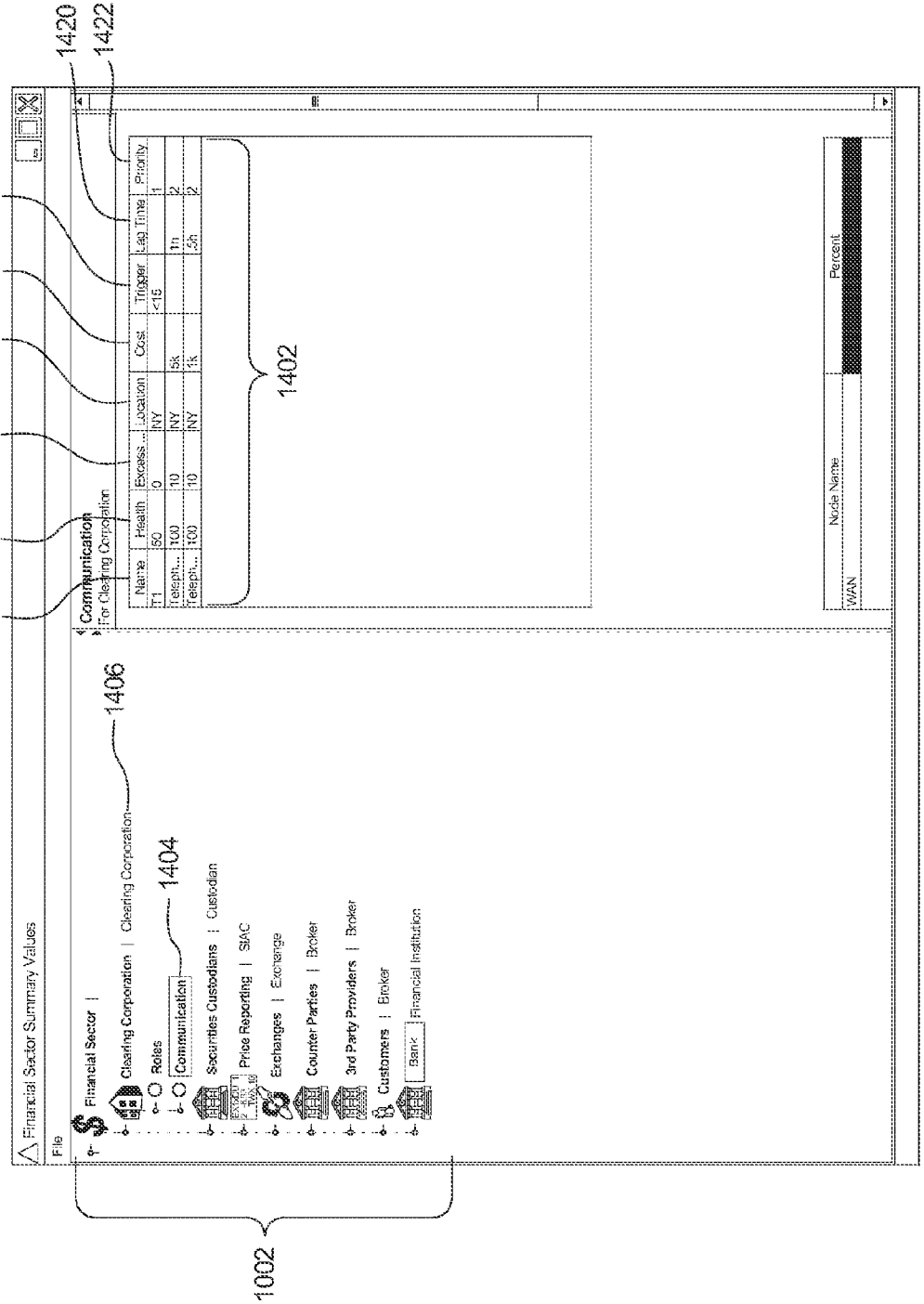
FIG. 14 is a screenshot of an example simulation model being edited via a table that includes a trigger value.

Another example of editing a simulation model via a table 1402 is illustrated in FIG. 14. In this example, details associated with a "Communication" branch 1404 of a "Clearing Corporation" 1406 are being edited. The table 1402 includes a "Name" column 1408, a "Health" column 1410, an "Excess" column 1412, a "Location" column 1414, a "Cost" column 1416, a "Trigger" column 1418, a "Lag Time" column 1420, and a "Priority" column 1422. This example shows that the primary communication line named "T1" is currently at 50% health. The "T1" line has a trigger indicating that if it goes below 15% health, there is a switch over to a backup communications line called "Telephone" that included 10 excess lines. However, this switch over has a cost of $5000 and takes 1 hour to complete.

When the simulation is running, different participants may have different views of the simulation. Three example views are shown in FIG. 15. A server view 1502 shows all of the nodes of the simulation at the highest level. In addition, a user with the server view may drill down to any exposed details. A BrokerCo view 1504 only shows the BrokerCo business entity 104 and its direct relationships (including a connection to Exchange 108). An Exchange view 1506 only shows the Exchange business entity 108 and its direct relationships (including a connection to BrokerCo 104).

Figure 16:
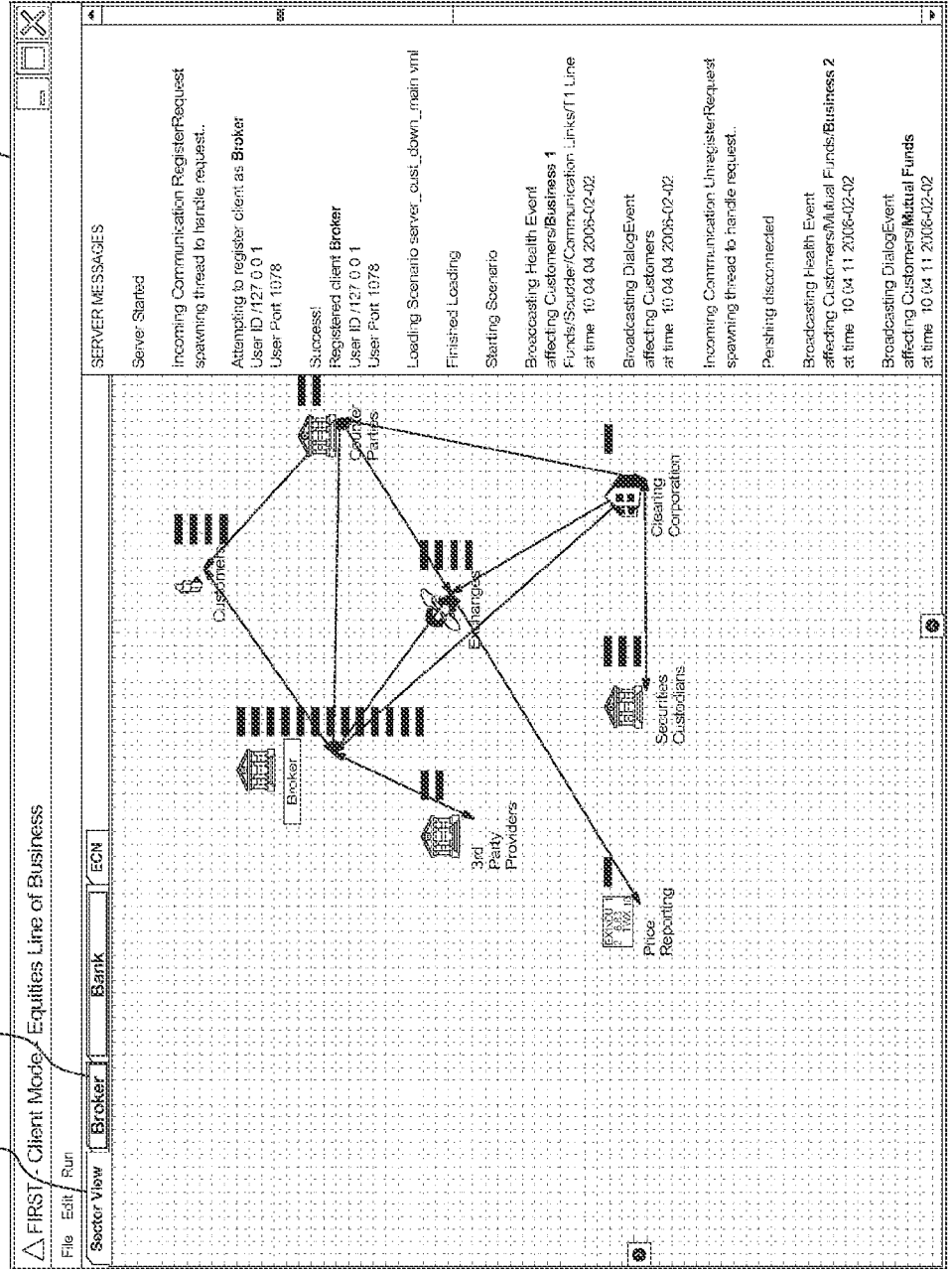
FIG. 16 is a screenshot of an example simulation from a server view when a server tab is selected.
Figure 17:
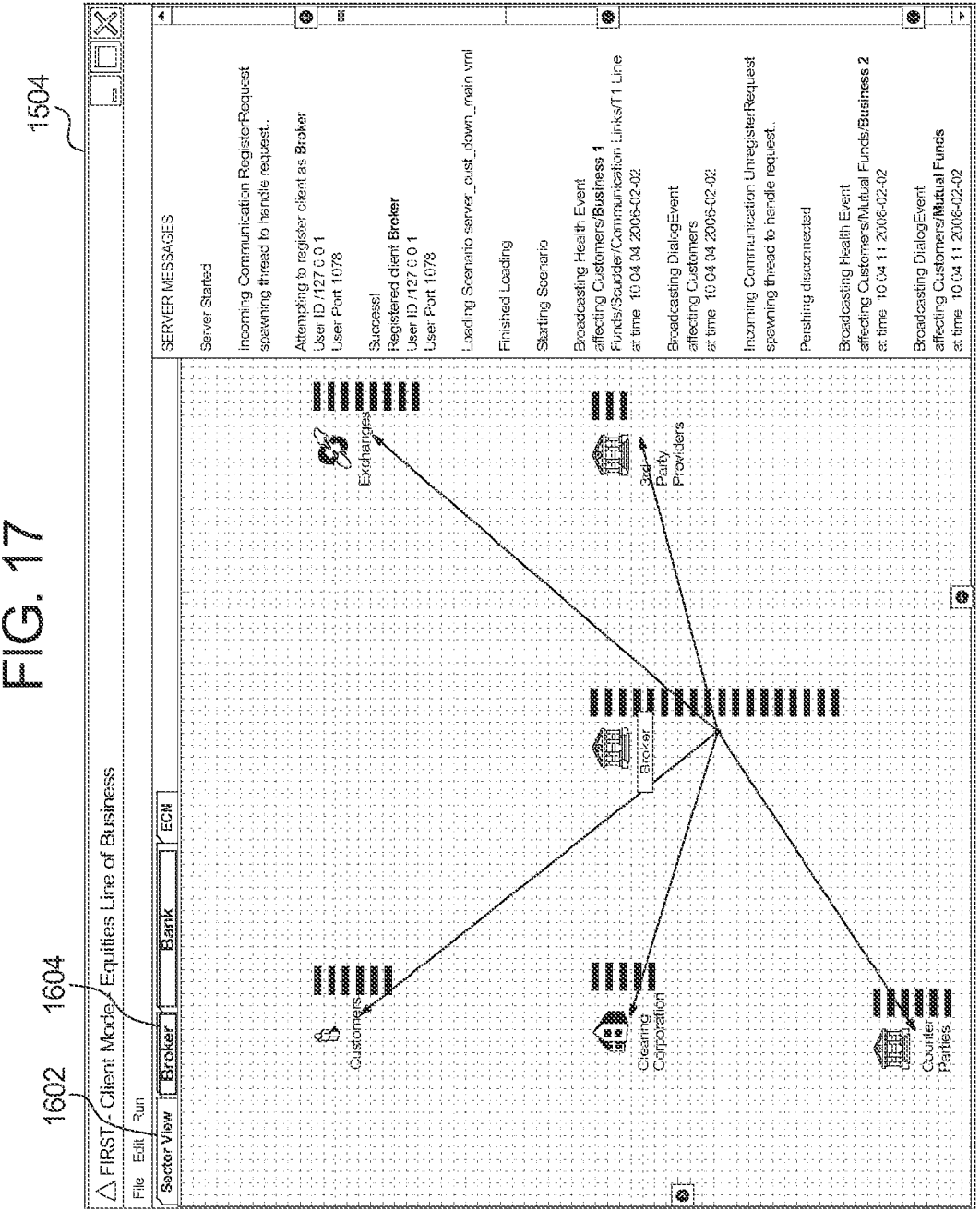
FIG. 17 is a screenshot of an example simulation from a client view when a client tab is selected.

Similarly, one participant may switch between different views. For example, the server view 1502 is shown in FIG. 16 because the user has selected a server tab 1602 as opposed to a client tab, such as a BrokerCo tab 1604. As shown in FIG. 17, when the BrokerCo tab 1604 is selected, the BrokerCo view 1504 is shown.

A master scenario events list controls one or more disruptions to the normal flow of business operations between the simulated business entities 102-112. The disruptions may be initiated by any authorized participant. For example, a user with the server view 1502 may be the only participant authorized to introduce disruptions. Alternatively, each participant may be authorized to initiate disruptions associated with itself and/or its direct relationships. In an embodiment, some participants 212-221 are associated with entities 102-111 and are primarily interested in operating a simulated business for a simulated profit, while other participants 212-221 are associated with adversary entities 102-111 and are primarily interested in disrupting one or more simulated businesses. A query engine allows a user to search for, select, and disrupt certain business entities 102-112. For example, a user may want to simulate a disruption of all "East Coast" business entities 102-112. In one embodiment, the logical connection maps are overlaid onto a physical location map. In such an instance, disruptions associated with certain geographies may be introduced graphically.

In an embodiment, the master scenario events list may be replaced or substantially modified by the simulated existence of an adversary that plays the role of an entity motivated to disrupt the business or one or more simulated organizations, or the simulated market as a whole. An adversary may have its own unique views of the simulated market, which may be limited by simulated tools, access, and opportunity to gain situational awareness about the target(s) the adversary intends to disrupt within the simulation. The extent of these views may vary over time as the adversary elects to commit effort to gaining additional knowledge about its intended target(s), as well as by actions taken by organizations participating within the market to defend their systems from disruption by a perceived adversary.

Figure 18:
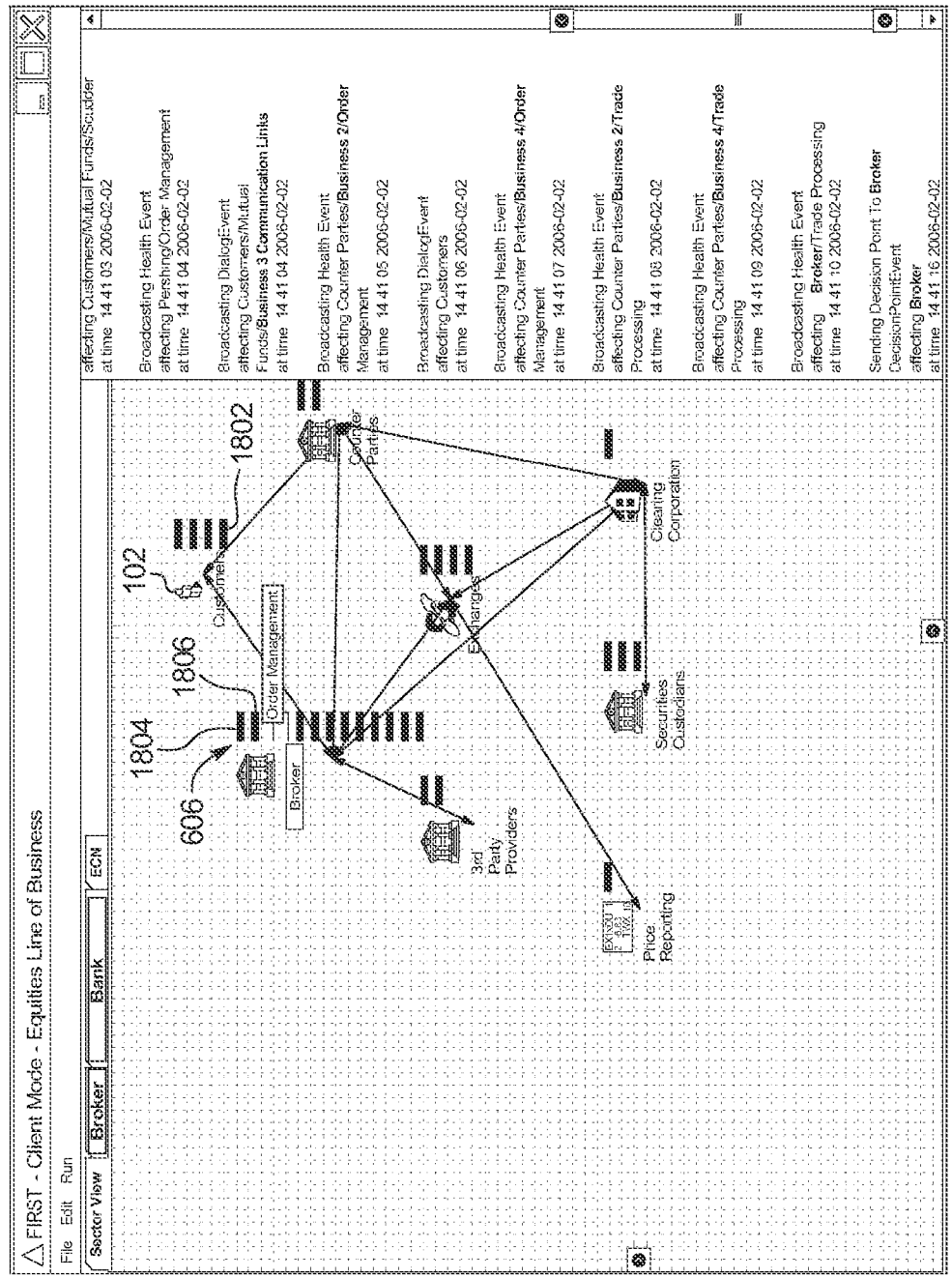
FIG. 18 is a screenshot of a top level view of an example simulation when a disruption occurs.

As shown in FIG. 18, when a business entity 102-112 is disrupted (either directly or indirectly), the branch indicator 606 associated with that business entity 102-112 acts as a meter bar to visually indicate (e.g., by a color change) that a problem is occurring. In this example, the Mutual Funds portion 1802 of the Customers entity 102 is having a problem. As a result, BrokerCo's order management role 1804 is not receiving its expected volume of business, and the color of the associated branch indicator 1804 is changed from green to yellow. In a ripple effect, BrokerCo's Trade processing role 1806 also reports a problem by changing color.

Figure 19:
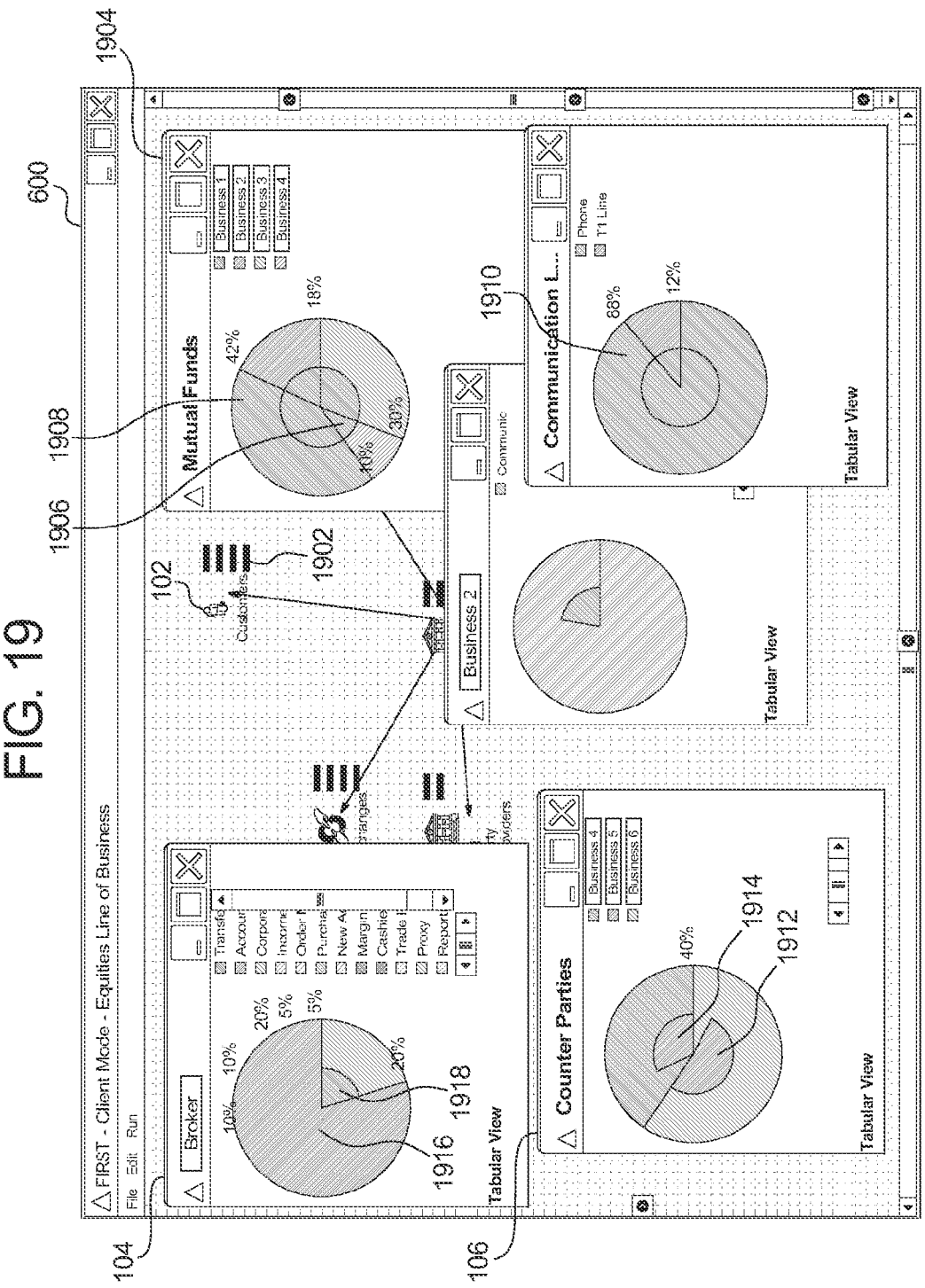
FIG. 19 is a screenshot of a lower level view of an example simulation when a disruption occurs.

More detail about a particular problem may be viewed by calling up the pie charts that define the simulation models. For example, in FIG. 19, five example pie charts are shown. The Customers icon 102 is indicating a problem with its mutual fund branch 1902. The mutual fund pie chart 1904 shows that the problem is with the Scudder branch 1906 as indicated by an inner meter 1908 that does not arc across the entire slice and/or an inner meter 1908 that has a different color. For example, the percentage of arc of the inner meter 1908 may indicated the percentage of health. Alternatively, or in addition, the inner meter 1908 may be colored a first color (e.g., green) for a first level of health (e.g., 100%), a second color (e.g., yellow) for a second level of health (e.g., 50%-99%), and a third color (e.g., red) for a third level of health (e.g., 0%-49%).

Figure 20:
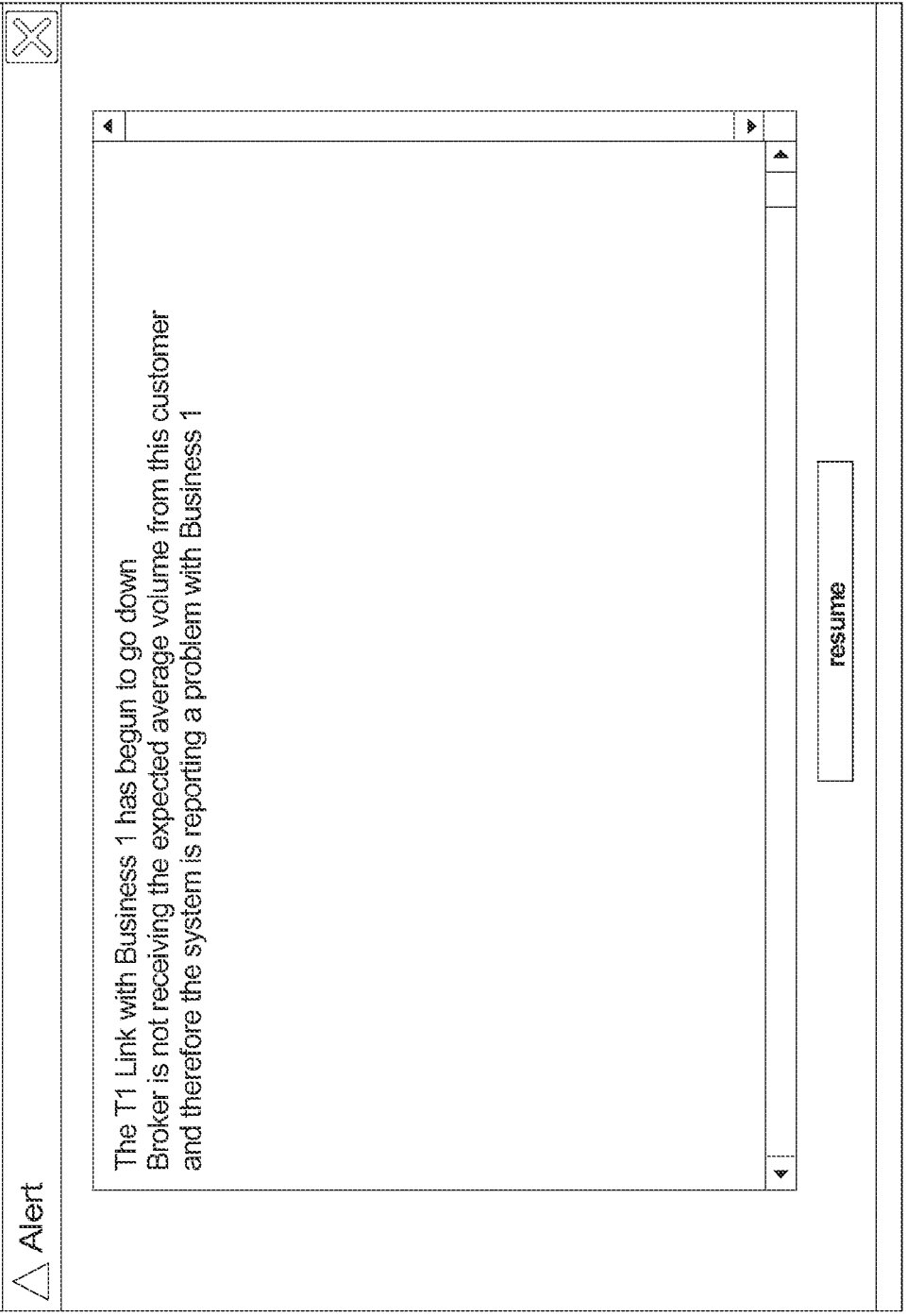
FIG. 20 is a screenshot of an example alert message.

Drilling down further in this example reveals that the T1 line 1910 at Scudder 1906 is almost completely down. As a result, counter parties 106 are starting to experience problems 1912, 1914 and BrokerCo 102 is starting to experience problems 1916, 1918. As shown in FIG. 20, whenever a business entity 102-112 experiences a problem, an alert message 2000 may be generated. These alerts may be triggered by thresholds set by the user.

Figure 21:
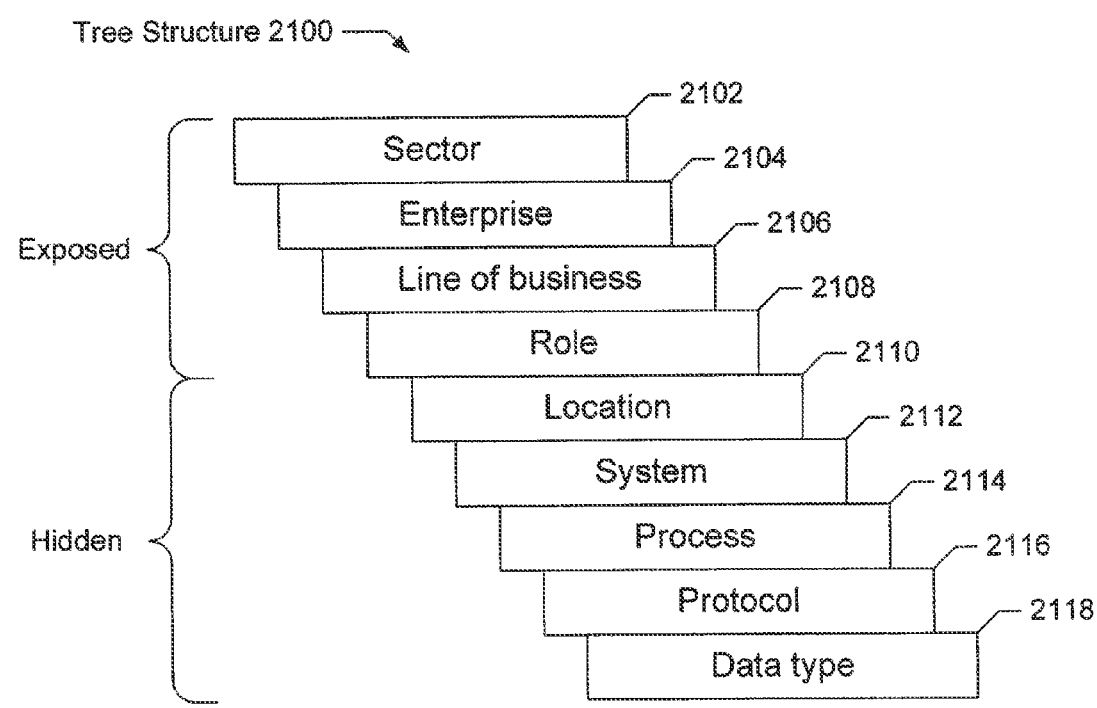
FIG. 21 is an example business system tree structure used to define a business system, expose certain details of that business system to other simulation participants, and/or play out different scenarios.

FIG. 21 is an example business system tree structure 2100 used to define a business system, expose certain details of that business system to other simulation participants, and/or play out different scenarios. As described above, each client simulation model 402-411 may be constructed using this example hierarchy. For example, a user could define what devices are located at what locations within an organization and what roles those devices play in the business model for that organization as shown in FIG. 11. Once a user has defined his/her client simulation model 402-411, the user may use the tree structure 2100 to select what levels of detail other simulation participants may see. For example, the user may choose to expose all details at the role level and above as shown in FIG. 11. During a simulation scenario, participants may respond to simulated events quickly using the tree structure 2100. For example, if flood is predicted for a particular geographical region, a simulation participant may quickly select that region in the tree structure 2100, shut all of the devices at that location down, and start a transfer process to use a backup location for those business functions. If switching over to that backup location takes one hour, other simulation participants may be directly or indirectly affected by the fact that the original location has been shut down.

As discussed above, the simulation system disclosed herein provides one or more breakpoints and one or more intervening warp periods. These breakpoints and associated warp periods may be predetermined and/or rule based. At each breakpoint, the controller of the simulation may set and/or adjust various simulation parameters. Similarly, player participants in the simulation may set their own organizational parameters and intended organizational actions at each break point. During the warp period between breakpoints, the closed-loop simulation advances and calculates the results of interactions between simulated organizations acting within a simulated business environment based on the player-set parameters and organizational actions as well as controller-set parameters and actions. When the simulation halts at the next breakpoint, the results of those interactions are presented to the controller and/or players. The controller may also return the simulation to any previous breakpoint. Preferably, returning the simulation to a previous breakpoint returns the game state for the controller and each of the players to the settings as they existed at the beginning of that breakpoint before the controller or any player set any organizational parameters within the simulation.

Figure 22:
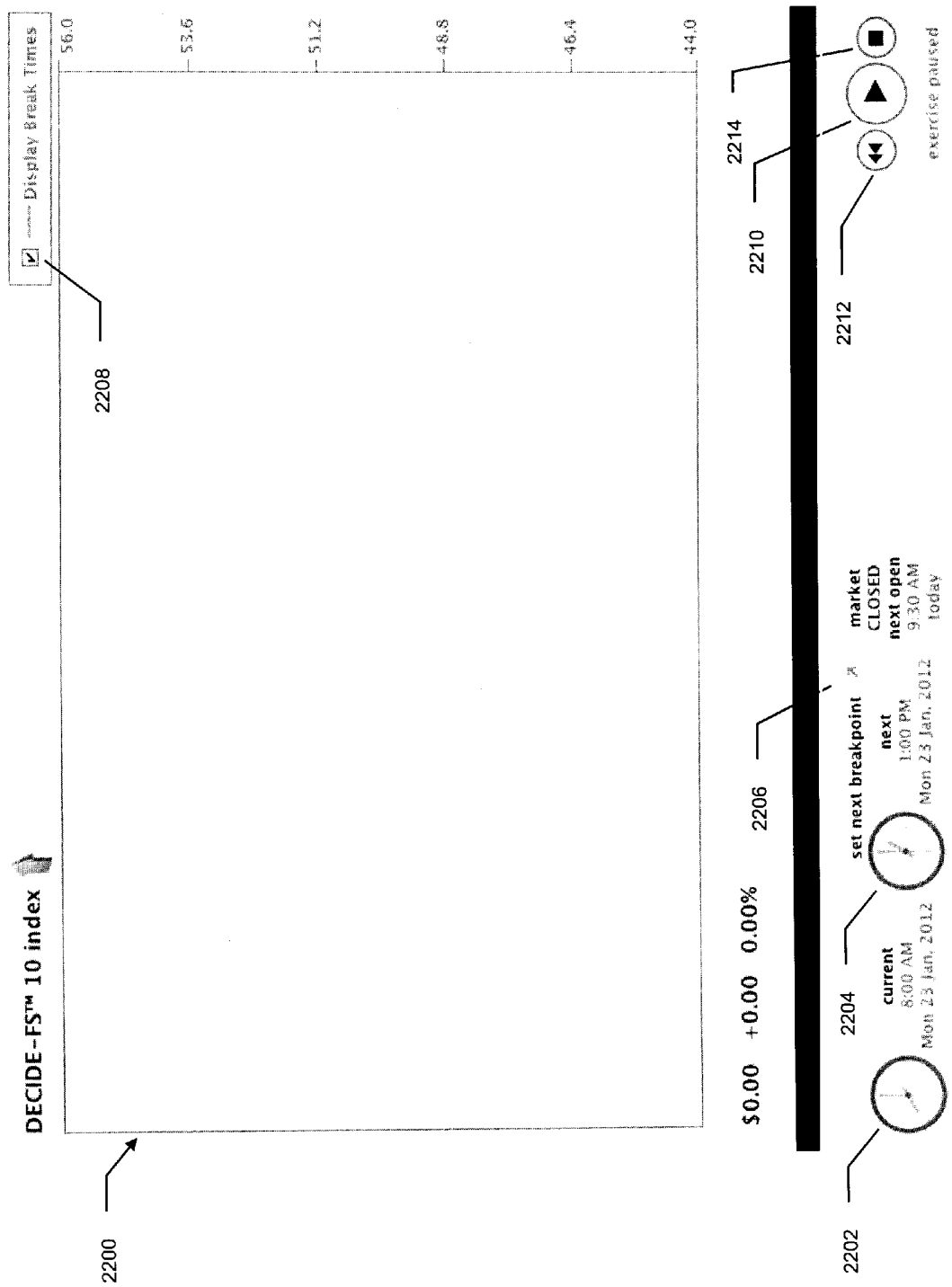
FIG. 22 is a screenshot of an example simulation before any simulation time has occurred.

FIG. 22 is a screenshot 2200 of an example simulation before any simulation time has occurred. In this example, the start 2202 of the simulated day is 8:00 AM on Monday Jan. 23, 2012. The first breakpoint 2204 occurs at 1:00 PM on that same day. In this example, this breakpoint 2204 was predetermined by the simulation controller. The simulation controller may set additional breakpoints by selecting a "set next breakpoint" control 2206. These breakpoints may be other simulated times and/or rule based. For example, the simulation controller may set a breakpoint for any time the market changes by more than some predetermined rate of change (e.g., >5% in one simulated hour). In some embodiments, one or more player participants may be allowed to set a breakpoint time and/or create a breakpoint rule. The controller and/pr players may also decide if break times should be displayed by selecting a "Display Break Times" check box 2208.

Once the controller has set one or more breakpoints, the controller may start the simulation by pressing a play button 2210 (e.g., after each player participant has set their own organizational parameters and intended organizational actions, and after the controller has set various simulation parameters). The controller may also revert to an earlier breakpoint using a back button 2212 and stop the simulation using a stop button 2214. When the controller presses the play button 2210 (or starts the simulation in any suitable manner), the software program advances time in the simulation from the current breakpoint to the next second breakpoint at a rate that is faster than real-time.

Figure 23:
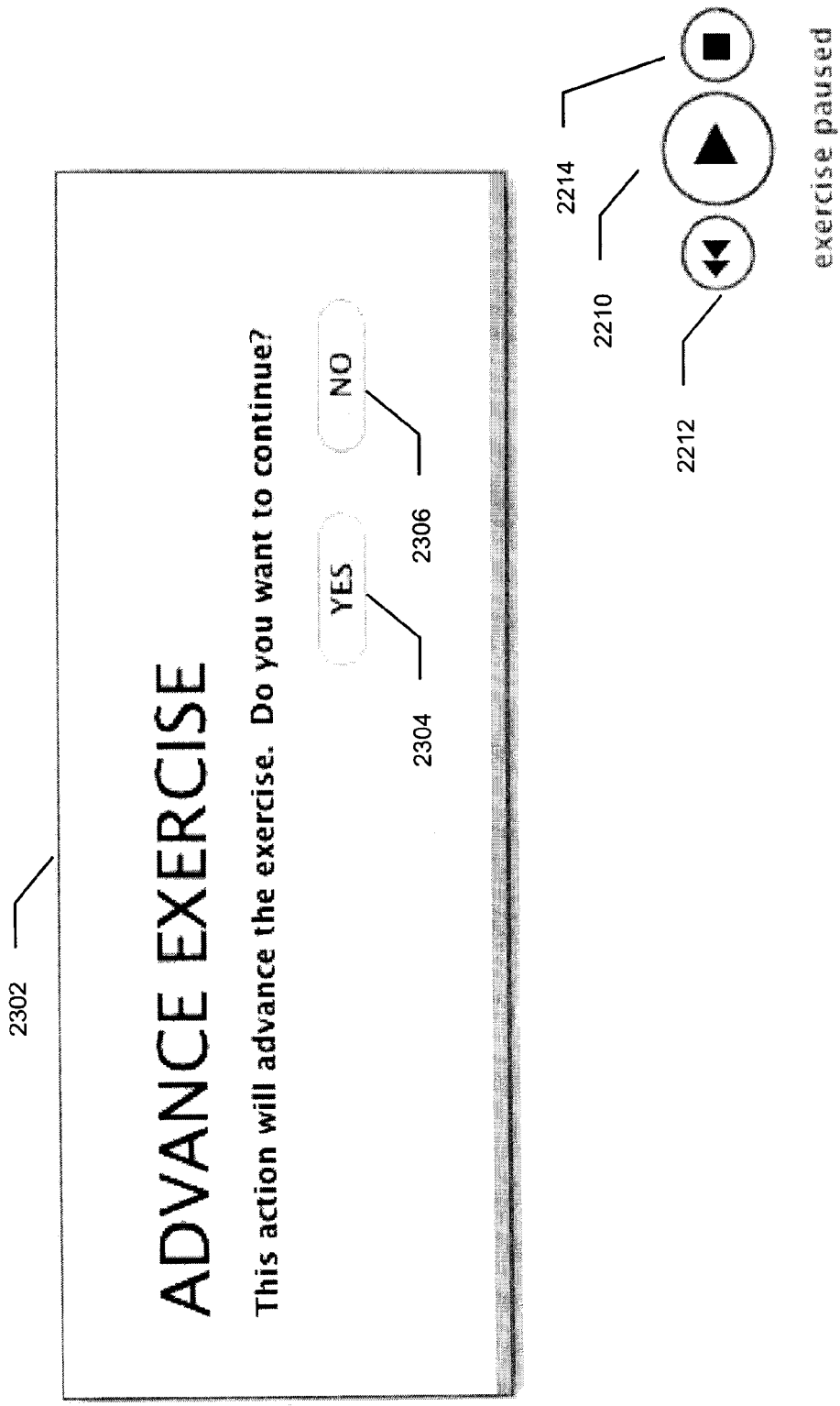
FIG. 23 is a screenshot of two example simulation controls for navigating between breakpoints.

FIG. 23 is a screenshot of two example simulation controls for navigating between breakpoints. The "advance exercise" dialog box 2302 gives the controller an opportunity to confirm 2304 or cancel 2306 the warping of the simulation from one breakpoint to the next break point. As described above, once the controller has set one or more breakpoints, the controller may start the simulation by pressing a play button 2210. The controller may also revert to an earlier breakpoint using a back button 2212 and stop the simulation using a stop button 2214.

Figure 24:
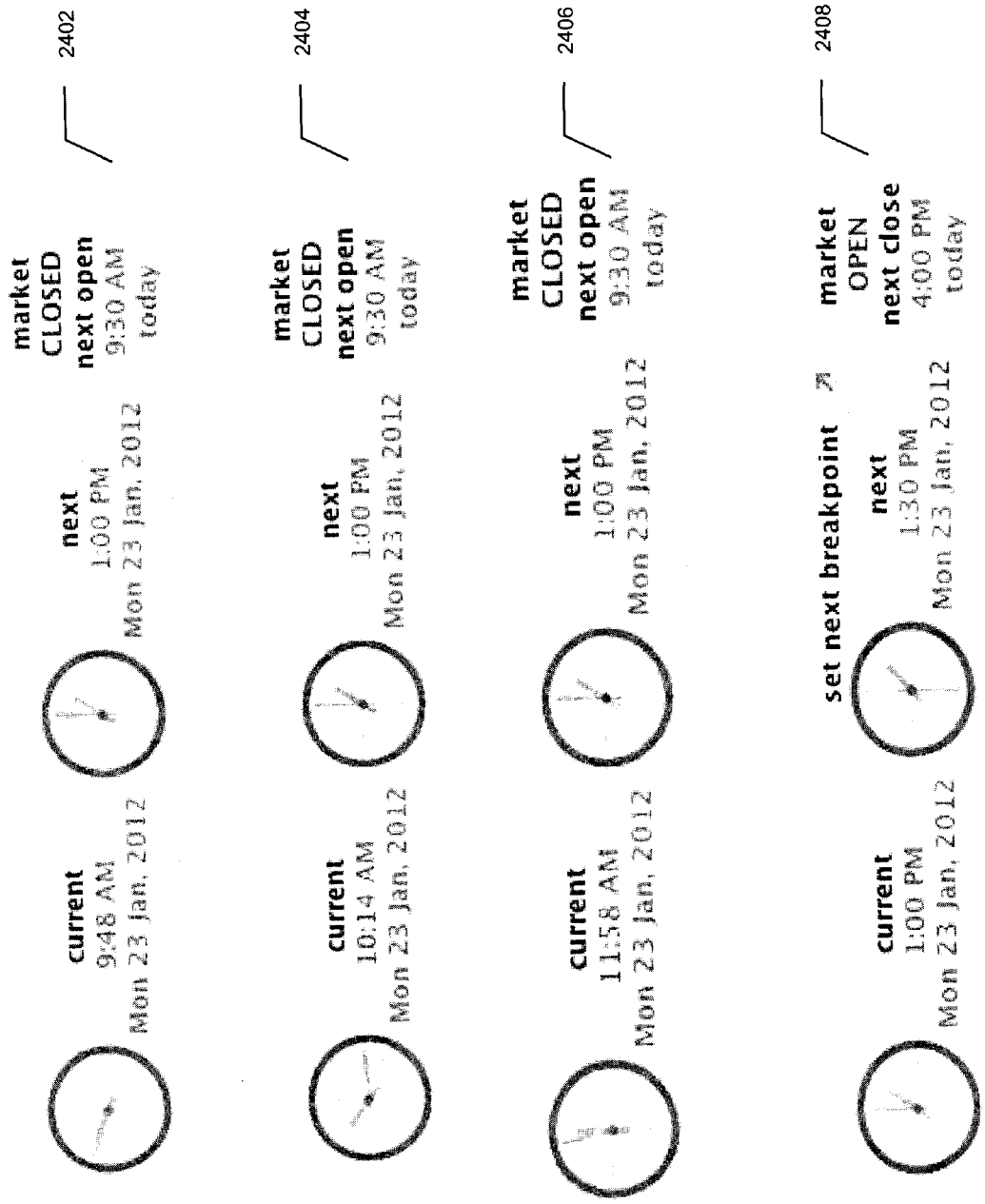
FIG. 24 is a screenshot of several breakpoint examples.

FIG. 24 is a screenshot of several breakpoint examples. In the first example 2402, the current simulated time is 9:48 AM on Monday Jan. 23, 2012. In this example, the next breakpoint occurs at 1:00 PM on that same day. In the second example 2404, the current simulated time is 10:14 AM on Monday Jan. 23, 2012. In this example, the next breakpoint occurs at 1:00 PM on that same day. In the third example 2406, the current simulated time is 11:58 AM on Monday Jan. 23, 2012. In this example, the next breakpoint occurs at 1:00 PM on that same day. In the fourth example 2408, the current simulated time is 1:00 PM on Monday Jan. 23, 2012. In this example, the next breakpoint occurs at 1:30 PM on that same day.

Figure 25:
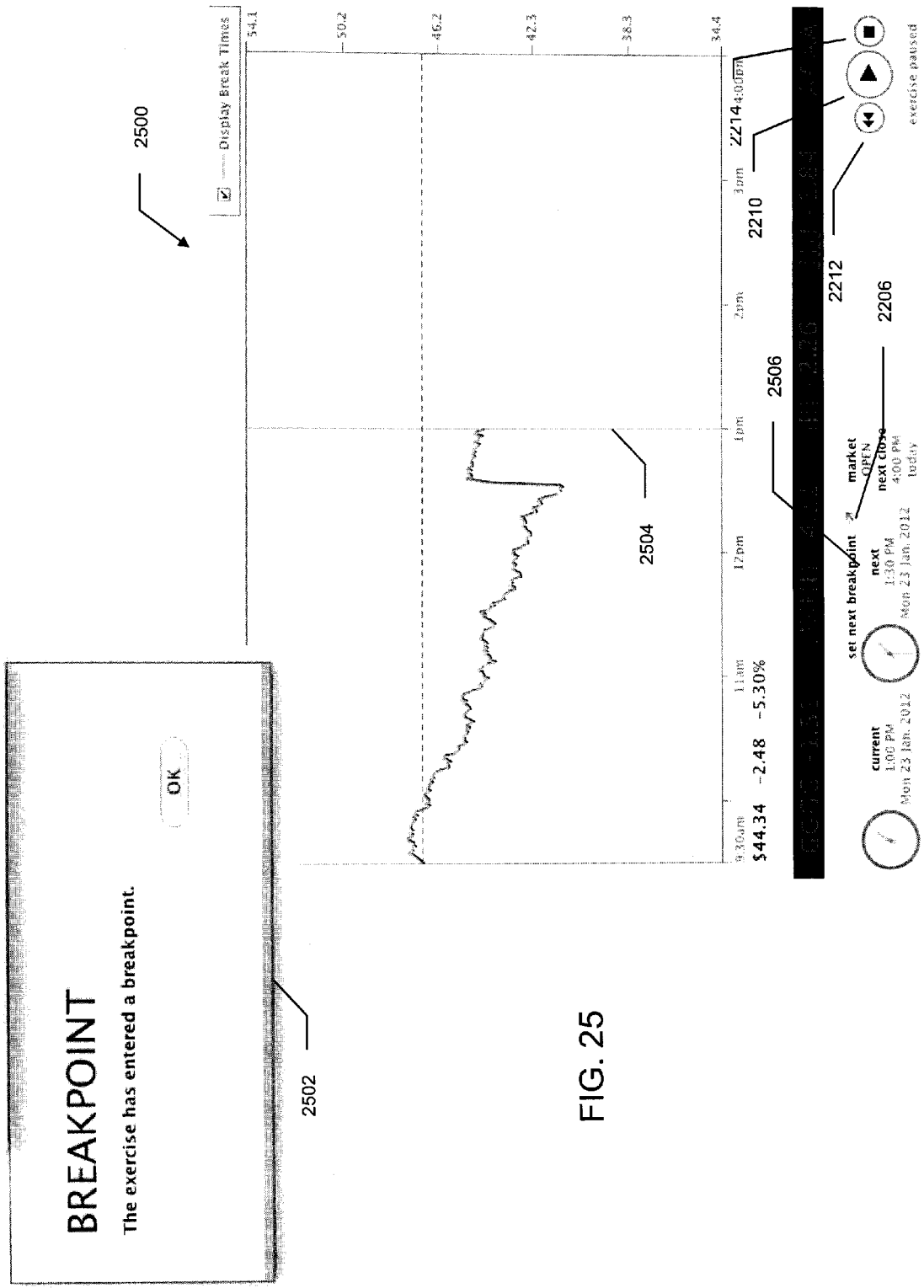
FIG. 25 is a screenshot of an example simulation after a breakpoint has been reached.

FIG. 25 is a screenshot 2500 of an example simulation after a breakpoint 2502 has been reached. In this example, a dialog box 2502 indicates that the breakpoint 2504 occurred at 1:00 PM of simulated time. In this example, the next breakpoint 2506 is set to occur at 1:30 PM. However, the controller could choose to set an earlier and/or a later breakpoint using the "set next breakpoint" control 2206.

Figure 26:
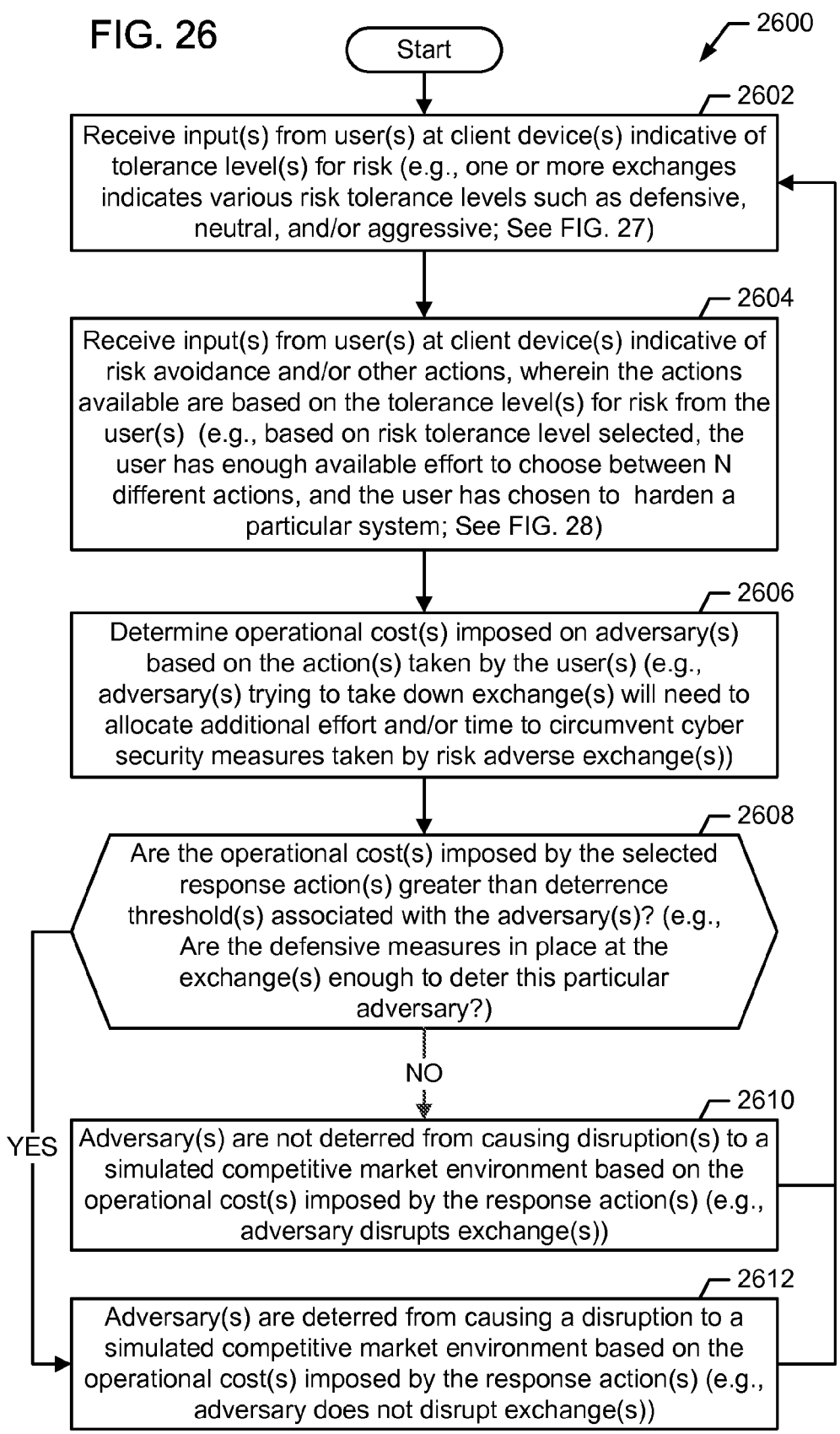
FIG. 26 is a flowchart of an example process for simulating risk tolerance, response actions, and associated adversary costs in a distributed business process.

A flowchart of an example process 2600 for simulating risk tolerance and associated adversary costs in a distributed business process is illustrated in FIG. 26. Preferably, the simulation process 2600 is embodied in one or more software programs which is stored in one or more memories and executed by one or more processors. For example, the simulation process 2600 may be software running on the simulation server 202 and/or one or more of the business entity client devices 102-111. Although the simulation process 2600 is described with reference to the flowchart illustrated in FIG. 26, it will be appreciated that many other methods of performing the acts associated with simulation process 2600 may be used. For example, the order of many of the steps may be changed, and some of the steps described may be optional.

The simulation process 2600 is typically executed by a simulation server 202. However, any other suitable device or combination of devices may execute the simulation process 2600. Generally, the simulation server 202 receives inputs from users 212-221 indicative of risk tolerance levels. Response actions available to an organization are limited by the resources available to that organization, and available resources are based on the risk tolerance levels selected by the organizations. The simulation server 202 then determines operational costs imposed on adversaries based on the response actions selected by the users 212-221. If the response actions taken by an organization within the simulated market impose operational on an adversary (real or simulated) that are not greater than the deterrence threshold of the adversary, then the simulation server 202 determines that this adversary is not deterred. On the other hand, if the operational costs imposed by one or more response actions taken by an organization are greater than the deterrence threshold of an adversary, then the simulation server 202 determines that this adversary is deterred.

Figure 27:
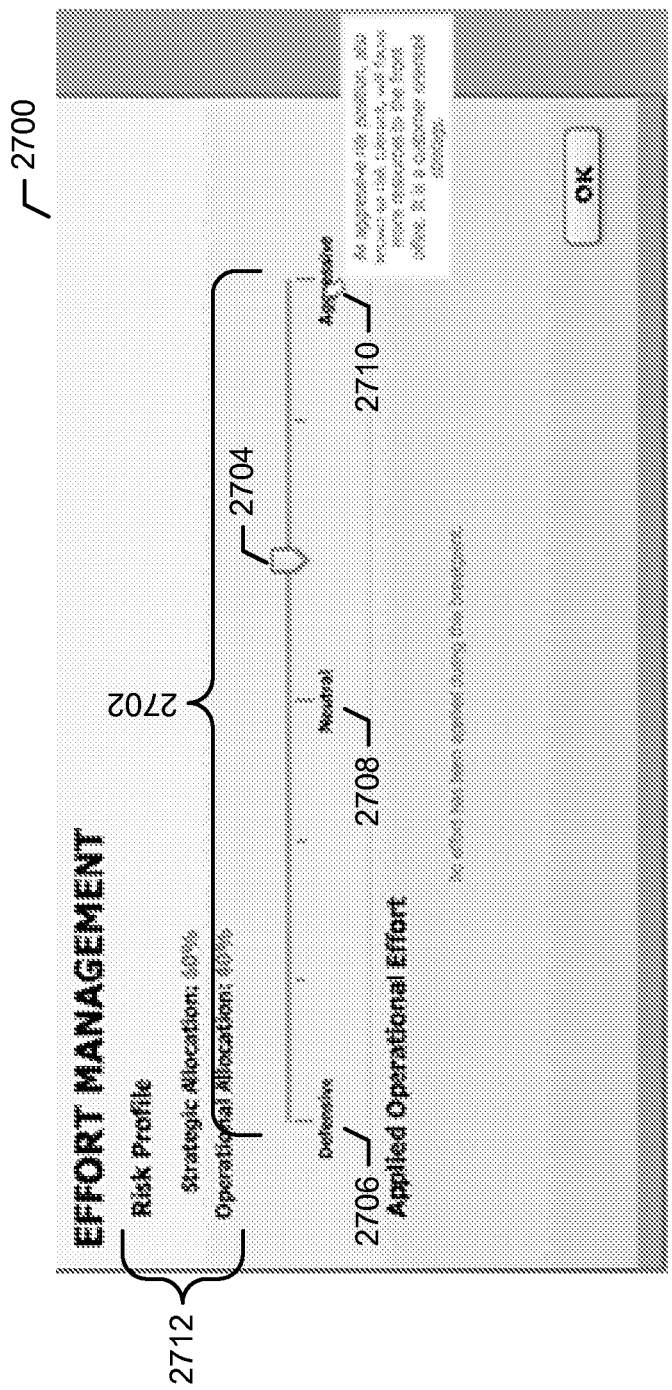
FIG. 27 is a screenshot of an example slider control allowing a user to indicate a risk tolerance level.

More specifically, the process 2600 begins when the simulation server 202 receives inputs from users 212-221 at client devices 102-111 indicative of tolerance levels for risk (block 2602). For example, one or more exchanges may indicate various risk tolerance levels such as defensive, neutral, and/or aggressive. A screenshot of an example slider control 2700 allowing a user 212-221 to indicate a risk tolerance level is illustrated in FIG. 27. In this example, the user 212-221 may select a range 2702 of risk tolerance levels by moving a slidable marker 2704. In this example, the user 212-221 may choose a defensive 2706 position, a neutral position 2708, an aggressive position 2710, or a plurality of other risk tolerance levels between these labeled levels 2706, 2708, and 2710.

A defensive position 2706 indicates that the user 212-221 has a low tolerance for risk. This type of user 212-221 does not like to take risks. As a result, more of this user's simulated effort is applied to back office operations (e.g., security), and less of this user's simulated effort is applied to front office operations (e.g., customers). An aggressive position 2710 indicates that the user 212-221 has a high tolerance for risk. This type of user 212-221 is willing to take risks. As a result, less of this user's simulated effort is available to be applied as a set of response actions to secure or restore back office operations (e.g., security), and more of this user's simulated effort is applied to front office operations (e.g., maximizing transactions). A neutral position 2708 is between a defensive position 2706 and an aggressive position 2710. This type of user 212-221 is somewhat risk tolerant and is willing to take some risks. As a result, this user's simulated effort is split between back office operations (e.g., security), and front office operations (e.g., customers).

A plurality of other mixes of back office effort and front office effort are similarly associated with a plurality of other risk tolerance levels between the labeled levels 2706, 2708, and 2710. For example, the slidable marker 2704 in FIG. 27 is in a position between neutral 2708 and aggressive 2710. In this example, the risk profile 2712 has a strategic allocation of 60% (e.g., apply 60% of the effort towards front office operations such as marketing) and an operational allocation of 40% (e.g., apply 40% of the effort towards back office operations such as hardening systems).

Once the simulation server 202 receives each user's risk tolerance levels (block 2602), corresponding to an allocation of back-office effort that may be applied, the simulation server 202 receives inputs from users 212-221 at client devices 102-111 indicative of risk avoidance and/or other actions, wherein the actions available are based on the tolerance levels for risk received from the users 212-221 (block 2604). For example, based on a risk tolerance level selected, the user may have enough available effort to choose between N (e.g., 10) different actions, and the user 212-221 chooses to use that available effort to harden a particularly critical system. Various example actions are described below with reference to FIG. 28.

The simulation server 202 then determines operational costs imposed on adversaries resulting from the response actions taken by the users 212-221 (block 2606). For example, an adversary attempting to take down an exchange will need to allocate additional effort and/or time to circumvent cyber security measures taken by risk adverse exchanges, which are using available effort to take individual and collective response actions to harden their systems, restore disrupted systems, and otherwise return their trading business(es) to a healthy state. These response actions also have the effect of imposing perceived costs on the adversary, because every time the adversary tries to disrupt a system that system's owner has an opportunity to try to defend it.

The simulation server 202 then determines if the operational costs imposed by a selected set of response actions are greater than a deterrence threshold associated with a particular adversary (block 2608). For example, the simulation server 202 determines if defensive measures in place at a particular exchange are enough to deter a particular adversary. If the operational costs imposed by a selected set of response actions are not greater than a deterrence threshold associated with a particular adversary, the simulation server 202 determines that this adversary is not deterred from causing a certain disruption to a simulated competitive market environment based on the operational costs imposed by those response actions (block 2610). For example, an adversary may be effective in using his available effort and knowledge of the player's systems and associated dependencies within the simulated market to cause the simulated closing of an exchange.

On the other hand, if the operational costs imposed by a selected set of response actions are greater than a deterrence threshold associated with a particular adversary, the simulation server 202 determines that this adversary is deterred from causing a certain disruption to a simulated competitive market environment based on the operational costs imposed by those response actions (block 2612).

Figure 28:
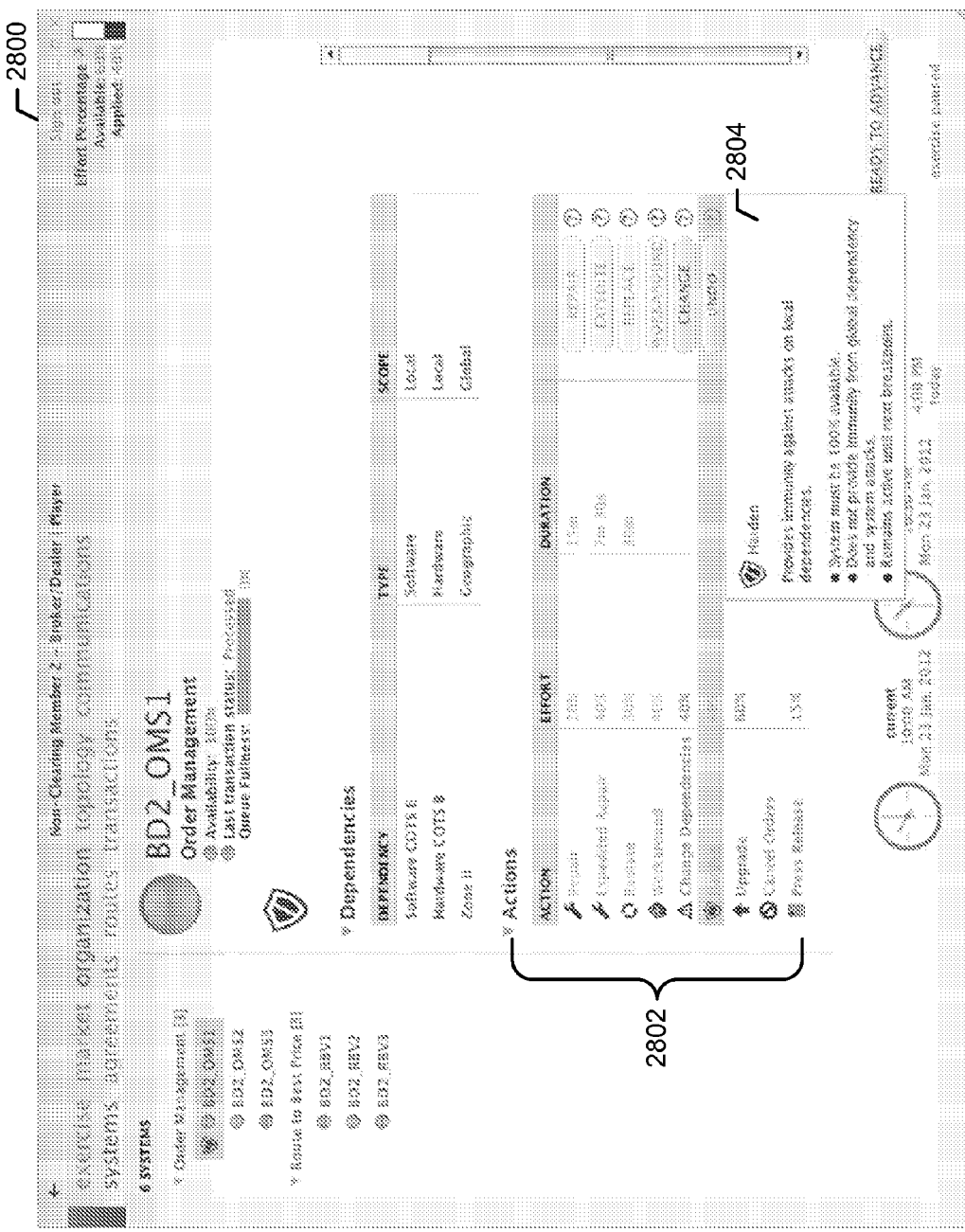
FIG. 28 is a screenshot of an example selection control allowing a user to indicate one or more risk avoidance actions.

The example slider control 2700 of FIG. 27 allows each user 212-221 to manage his/her effort allocation as it is related to risk tolerance. However, the slider control 2700 does not allow users to select specific risk avoidance actions. A screenshot 2800 of an example selection control 2802 allowing a user to indicate one or more risk avoidance actions is illustrated in FIG. 28. In this example, the user 212-221 may choose from a combination of actions such as investigate, repair, expedited repair, replace, workaround, change dependencies, harden, upgrade, cancel order, and/or press release.

The investigate action allows a player to apply effort to gain greater situational awareness about the risks associated with a disruption, its root cause, it's likely time to repair, and/or its potential impact on the organization's business. Any choice to investigate comes at the cost of expending effort and/or time. The results of an investigation may not appear until the next breakpoint, and even then may not result in any greater certainty about the situation. Conversely, the results may result in a much higher degree of certainty about the situation, and therefore reduced risk that the player's other response actions (such as shutting down an operational system) may result in unnecessary negative consequences to the organization.

The repair action recovers system availability. While a system is being recovered, transactions routed to that system continue to accrue until the system queue is exhausted. Once the system queue is exhausted, transactions routed to that system begin failing. An expedited repair is like a repair. However, and expedited repair requires a higher allocation of user effort and occurs more quickly. The replace action also recovers system availability. When replacing a system, all queued transactions fail. In addition, while a system is being replaced, transactions routed to that system fail.

The workaround action allows a system to successfully process transactions routed to the system as if that system were fully operational. However, this solution wears off over time. The change dependencies action allows a user 212-221 to delete one or more existing dependencies from a system and/or add new dependencies to that system. For example, if system A relies on system B for proper operation, the user 212-221 may choose to switch that dependency to system C because system B is slow, malfunctioning, or down.

The harden action 2804 lessens the severity of some or all types of attacks on a system. However, the hardening wears off over time. The upgrade action changes a system so that system has a lower latency, an increased throughput, and/or an increased size. The cancel order action cancels all orders for a particular system.

The press release action improves a user's reputation. For example, for a broker/dealer, this causes a larger proportion of transactions to be routed to that broker/dealer if there are transaction generators linked to that broker/dealer that are distributed transactions to multiple broker/dealers. A user's reputation will then diminish over time if the user's transaction processing performance does not support that reputation. In another example, for an exchange, a press release prevents self-help from being declared against the exchange during the following warp time period.

Figure 29:
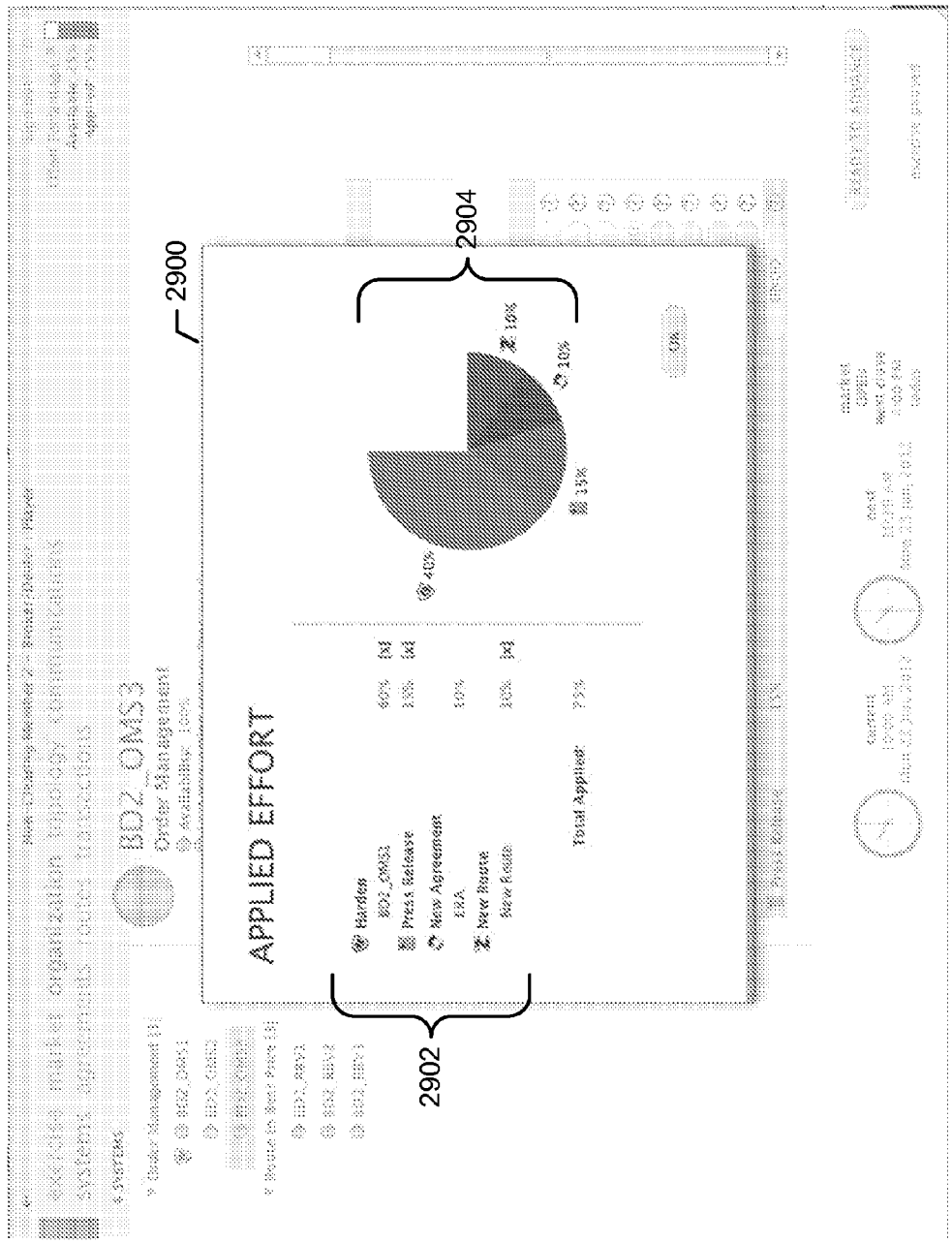
FIG. 29 is a screenshot of an example message box indicating how a user's effort was applied.

A screenshot of an example message box 2900 indicating how a user's effort was applied is illustrated in FIG. 29. In this example, an effort list 2902 and a corresponding pie chart 2904 show that 40% of the user's effort for this round of the simulation (e.g., fixed amount of equivalent real-time and/or until the advancement to a breakpoint) was applied to the back office (e.g., security) action of hardening a particular system. This application of effort is a result of a user 212-221 selecting a risk tolerance level 2704 that resulted in an operational allocation of 40% (see 2712 of FIG. 27) and the hardening action (see 2804 of FIG. 28). In this example, a total of 35% of the user's effort was applied to three different front office (e.g., customer oriented) actions. In particular, this example shows 15% of the user's effort for this round was applied to a press release, 10% of the user's effort for this round was applied to forming a new agreement, and 10% of the user's effort for this round was applied to establishing a new route. In this example, 25% of the user's effort for this round was unused.

In summary, persons of ordinary skill in the art will readily appreciate that methods and apparatus for simulating risk tolerance and associated adversary costs in a distributed business process are disclosed. Specifically, the simulation system disclosed herein uses a secure distributed model wherein each business entity models itself on a local client device at any chosen level of detail, and a simulation server connects the separate client based simulations into one large simulation without exposing unauthorized details of one participant's internal simulation details to another simulation participant.

In addition, the simulation server receives inputs from users indicative of risk tolerance levels. If the operational costs imposed by a selected risk tolerance are greater than a deterrence threshold associated with a particular adversary, the adversary is not deterred from causing a certain disruption to the simulated competitive market environment. If the operational costs imposed by a selected risk tolerance are greater than the deterrence threshold the adversary is deterred.

The foregoing description has been presented for the purposes of illustration and description. It is not intended to be exhaustive or to limit the invention to the example embodiments disclosed. Many modifications and variations are possible in light of the above teachings. It is intended that the scope of the invention be limited not by this detailed description of examples, but rather by the claims appended hereto.

What is claimed is:

1. An apparatus to execute a distributed business process simulation of a competitive market environment, the apparatus comprising:
    a simulation server;
    a plurality of client devices communicatively coupled to the simulation server, each client device in the plurality of client devices providing different inputs and different outputs associated with different portions of the business process simulation of the competitive market environment, wherein at least one input from a first client device in the plurality of client devices has an indirect influence on at least one output of a second different client device in the plurality of client devices; and
    a software program executing on the simulation server, the software program causing the simulation server to:
        receive a user input from the first client device indicative of a risk tolerance level;
        transmit a set of available response actions based on the selected risk tolerance level;
        receive a selected response action from the first client device, the selected response action being selected from the set of available response actions;
        determine an operational cost imposed on an adversary based on the selected response action, the operational cost having an effect of one of (a) deterring the adversary from causing a disruption to a simulated competitive market environment, and (b) not deterring the adversary from causing the disruption to the simulated competitive market environment.

2. The apparatus of claim 1, wherein the risk tolerance level selected by the first client device contributes indirectly to a systemic risk level for other client devices in the plurality of client devices.

3. The apparatus of claim 1, wherein the adversary is a user at a third client device.

4. The apparatus of claim 1, wherein the adversary is simulated.

5. The apparatus of claim 1, wherein the software program uses predetermined substitute data if the software program does not receive simulation data from the first client device.

6. The apparatus of claim 1, wherein the software program facilitates creation of a simulation model that indicates a plurality of simulation model details to be exposed to other simulation participants.

7. The apparatus of claim 6, wherein the software program facilitates creation of a simulation model that indicates a plurality of simulation model details to be hidden from other simulation participants.

8. The apparatus of claim 1, wherein the software program facilitates creation of a simulation model that indicates a plurality of simulation model details to be hidden from other simulation participants.

9. The apparatus of claim 1, wherein the software program receives a disruption command via a user input device at the simulation server and transmits an effect of the disruption command to the first client device and the second client device.

10. The apparatus of claim 9, wherein the disruption command is associated with a geographical region.

11. The apparatus of claim 10, wherein the geographical region is graphically selected via a map.

12. The apparatus of claim 1 wherein the first client device includes the second client device.

13. The apparatus of claim 1 wherein the first client device includes the simulation server.

14. The apparatus of claim 1 wherein the second client device includes the simulation server.

15. The apparatus of claim 1 wherein the first client device includes the second client device and the simulation server.

16. A computer readable memory storing instructions to cause at least one computer to:
    process different inputs and different outputs associated with different portions of a business process simulation, wherein at least one input from a first client device in a plurality of client devices has an indirect influence on at least one output of a second different client device in the plurality of client devices; and
    process a user input from the first client device indicative of a tolerance level for risk, which determines effort availability and constraints on a variety of potential operational response actions, wherein the operational response actions accepted by the first client device contributes to a first level of systemic risk for other client devices in the plurality of client devices, the first set of response actions imposing a first operational cost on an adversary that deters the adversary from causing a disruption to a simulated competitive market environment, and a second higher tolerance level results in actions taken that in turn result in a second different level of systemic risk for the other client devices in the plurality of client devices, the second higher tolerance level resulting in actions that impose a second different cost on the adversary that does not deter the adversary from causing the disruption to the simulated competitive market environment.

17. The computer readable memory of claim 16, wherein the adversary is a user at a third client device.

18. The computer readable memory of claim 16, wherein the adversary is simulated.

19. The computer readable memory of claim 16, wherein the instructions are structured to cause the at least one computer to substitute data if the software program does not receive simulation data from the first client device.

20. The computer readable memory of claim 16, wherein the instructions are structured to cause the at least one computer to create a simulation model that indicates a plurality of simulation model details to be exposed to other simulation participants.

21. The computer readable memory of claim 20, wherein the instructions are structured to cause the at least one computer to create a simulation model that indicates a plurality of simulation model details to be hidden from other simulation participants.

22. The computer readable memory of claim 16, wherein the instructions are structured to cause the at least one computer to create a simulation model that indicates a plurality of simulation model details to be hidden from other simulation participants.

23. The computer readable memory of claim 16, wherein the instructions are structured to cause the at least one computer to receive a disruption command via a user input device at the simulation server and transmits an effect of the disruption command to the first client device and the second client device.

24. The computer readable memory of claim 23, wherein the disruption command is associated with a geographical region.

25. The computer readable memory of claim 24, wherein the geographical region is graphically selected via a map.

26. The computer readable memory of claim 16 wherein the first client device includes the second client device.

27. The computer readable memory of claim 16 wherein the first client device includes the simulation server.

28. The computer readable memory of claim 16 wherein the second client device includes the simulation server.

29. The computer readable memory of claim 16 wherein the first client device includes the second client device and the simulation server.

* * * * *